US007022776B2

(12) United States Patent
Bastiaens et al.

(10) Patent No.: US 7,022,776 B2
(45) Date of Patent: Apr. 4, 2006

(54) CONDUCTIVE POLYPHENYLENE ETHER-POLYAMIDE COMPOSITION, METHOD OF MANUFACTURE THEREOF, AND ARTICLE DERIVED THEREFROM

(75) Inventors: Jozef Herman Peter Bastiaens, Bergen op Zoom (NL); Gerardus Johannes Cornelis Doggen, Kruisland (NL); Josephus Gerardus M. van Gisbergen, Bergen op Zoom (NL)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 09/683,002

(22) Filed: Nov. 7, 2001

(65) Prior Publication Data

US 2003/0092824 A1 May 15, 2003

(51) Int. Cl.
*C08L 71/12* (2006.01)
*C08L 53/00* (2006.01)
*C08L 77/00* (2006.01)

(52) U.S. Cl. .................. 525/391; 525/92 B; 525/92 D; 525/88; 525/89; 524/495

(58) Field of Classification Search ................ 252/511; 524/495; 525/88, 89, 92 R, 92 B, 92 D, 525/352, 39 L
See application file for complete search history.

(56) References Cited

U.S. PATENT DOCUMENTS 3,257,357 A 6/1966 Stamatoff .................... 260/47
3,257,358 A 6/1966 Stamatoff .................... 260/47
3,306,874 A 2/1967 Hay ............................ 260/47
3,306,875 A 2/1967 Hay ............................ 260/47
3,379,792 A 4/1968 Finholt ....................... 260/857
3,428,699 A 2/1969 Schleimer ................... 260/669
3,756,999 A 9/1973 Stetter et al. ........... 260/88.2 S
3,822,227 A 7/1974 Hermann et al. ....... 260/28.5 A
3,876,721 A 4/1975 Yasui et al. ............. 260/680 B
3,884,882 A 5/1975 Caywood, Jr. ......... 260/78.4 D
3,914,266 A 10/1975 Hay ........................ 260/438.1
4,011,200 A * 3/1977 Yonemitsu et al. ..... 260/47 ET
4,028,341 A 6/1977 Hay ....................... 260/47 ET
4,038,343 A * 7/1977 Yonemitsu et al. ......... 260/874
4,054,612 A 10/1977 Yagi et al. ............... 260/669 P
4,147,740 A 4/1979 Swiger et al. .......... 260/878 R
4,174,358 A 11/1979 Epstein ....................... 525/183
4,226,991 A 10/1980 Nakahara et al. ........... 544/221
4,251,644 A 2/1981 Joffrion ....................... 525/64
4,315,086 A 2/1982 Ueno et al. ................. 525/391
4,346,194 A 8/1982 Roura ......................... 525/66
4,474,927 A 10/1984 Novak ......................... 525/66
4,565,684 A 1/1986 Tibbetts et al. .......... 423/447.3
4,566,990 A * 1/1986 Liu et al. ..................... 252/503
4,572,813 A 2/1986 Arakawa ................... 264/29.2
4,600,741 A 7/1986 Aycock et al. .............. 524/139
4,642,358 A 2/1987 Aycock et al. .............. 549/245
4,663,230 A 5/1987 Tennent ...................... 428/367
4,681,915 A 7/1987 Bates et al. ................. 525/148
4,742,115 A 5/1988 Mawatari et al. ............. 525/68
4,774,355 A 9/1988 Omori et al. ............... 560/152
4,798,865 A 1/1989 Grant et al. .................. 525/92
4,806,297 A 2/1989 Brown et al. ............... 264/102
4,806,602 A 2/1989 White et al. ................ 525/397
4,816,289 A 3/1989 Komatsu et al. ......... 423/447.3
4,826,933 A 5/1989 Grant et al. ................ 525/397
4,857,575 A * 8/1989 van der Meer et al. ..... 524/398
4,866,114 A 9/1989 Taubitz et al. .............. 524/100
4,874,810 A * 10/1989 Lee et al. ................... 524/505
4,876,078 A 10/1989 Arakawa et al. ......... 423/447.3
4,923,924 A 5/1990 Grant et al. .................. 525/66
4,927,894 A 5/1990 Brown ....................... 525/390
4,935,472 A 6/1990 Brown et al. ............... 525/394
4,957,966 A * 9/1990 Nishio et al. ................. 525/66
4,980,424 A 12/1990 Sivavec ...................... 525/397
5,017,652 A * 5/1991 Abe et al. ..................... 525/68
5,024,818 A 6/1991 Tibbetts et al. ............ 422/158
5,041,504 A 8/1991 Brown et al. ............... 525/396
5,055,606 A 10/1991 Fisch et al. ................. 560/152
5,057,622 A 10/1991 Chisholm et al. ........... 560/152
5,069,818 A 12/1991 Aycock et al. .............. 525/397
5,089,566 A 2/1992 Brown et al. ............... 525/396
5,109,052 A * 4/1992 Kasai et al. ................ 524/505
5,112,907 A 5/1992 Nishio et al. ................. 525/65
5,115,042 A 5/1992 Khouri et al. .............. 525/397
5,120,801 A * 6/1992 Chambers ................... 525/397
5,159,004 A * 10/1992 Furata et al. ............... 524/390
5,159,018 A 10/1992 Nishio et al. ............... 525/132
5,165,909 A 11/1992 Tennent et al. .......... 423/447.3
5,198,486 A 3/1993 Chisolm et al. ............ 524/302
5,237,002 A 8/1993 Nishio et al. ................. 525/66
5,248,728 A * 9/1993 Lee, Jr. .................... 525/92 B
5,262,478 A 11/1993 Nishio et al. ................. 525/68
5,324,782 A * 6/1994 Lee, Jr. .................... 525/92 B (Continued)

FOREIGN PATENT DOCUMENTS

EP 153074 A2 8/1985

(Continued)

OTHER PUBLICATIONS

JP 2001-302905 (abstract and translation in English).*

(Continued)

*Primary Examiner*—David W. Wu
*Assistant Examiner*—Rip A. Lee

(57) ABSTRACT

A conductive thermoplastic composition includes specific amounts of a polyphenylene ether copolymer, a polyamide, and an electrically conductive filler. The composition exhibits excellent high-temperature dimensional stability and impact strength, and it is particularly useful for molding automotive body panels that are subsequently electrostatically painted.

22 Claims, No Drawings

U.S. PATENT DOCUMENTS

| | | | | |
|---|---|---|---|---|
| 5,331,060 | A | 7/1994 | Aycock et al. | 525/397 |
| 5,397,822 | A * | 3/1995 | Lee, Jr. | 524/127 |
| 5,397,838 | A * | 3/1995 | Ohtomo et al. | 525/92 |
| 5,534,600 | A * | 7/1996 | Bailly et al. | 525/397 |
| 5,554,693 | A * | 9/1996 | Ohtomo et al. | 525/133 |
| 5,589,152 | A | 12/1996 | Tennent et al. | 423/447.3 |
| 5,591,312 | A | 1/1997 | Smalley | 204/157.41 |
| 5,591,382 | A | 1/1997 | Nahass et al. | 252/511 |
| 5,591,832 | A | 1/1997 | Koshijima et al. | 530/500 |
| 5,596,040 | A * | 1/1997 | Miya et al. | 525/92 B |
| 5,641,455 | A | 6/1997 | Rosenlund et al. | 422/28 |
| 5,643,502 | A | 7/1997 | Nahass et al. | 252/511 |
| 5,760,125 | A * | 6/1998 | Ohtomo et al. | 524/508 |
| 5,830,326 | A | 11/1998 | Iijima | 204/173 |
| 5,843,340 | A * | 12/1998 | Silvi et al. | 252/511 |
| 5,919,429 | A | 7/1999 | Tanaka et al. | 423/445 B |
| 5,977,240 | A * | 11/1999 | Lohmeijer et al. | 524/495 |
| 6,171,523 | B1 | 1/2001 | Silvi et al. | 252/511 |
| 6,183,714 | B1 | 2/2001 | Smalley et al. | 423/447.3 |
| 6,221,283 | B1 * | 4/2001 | Dharmarajan et al. | 252/511 |
| 6,277,907 | B1 * | 8/2001 | Gelbin | 524/196 |
| 6,352,654 | B1 * | 3/2002 | Silvi et al. | 252/511 |
| 6,353,050 | B1 * | 3/2002 | Bastiaens et al. | 524/538 |
| 6,469,093 | B1 * | 10/2002 | Koevoets et al. | 524/495 |
| 6,500,895 | B1 * | 12/2002 | Bastiaens et al. | 524/538 |
| 6,528,572 | B1 * | 3/2003 | Patel et al. | 524/495 |
| 2001/0031831 | A1 * | 10/2001 | Miyoshi et al. | 525/138 |
| 2002/0040090 | A1 * | 4/2002 | Kurasawa et al. | 524/496 |

FOREIGN PATENT DOCUMENTS

| | | | | |
|---|---|---|---|---|
| EP | 231626 | B1 | | 8/1987 |
| EP | 337 814 | A2 | * | 10/1989 |
| EP | 337814 | A2 | | 10/1989 |
| EP | 0 506 386 | A2 | | 3/1992 |
| EP | 627466 | A2 | | 12/1994 |
| EP | 0 673 974 | A1 | * | 9/1995 |
| EP | 0 675 165 | A1 | * | 10/1995 |
| EP | 0 866 098 | A1 | * | 9/1998 |
| EP | 0 924 261 | A1 | * | 6/1999 |
| JP | 2001-302905 | A | * | 10/2001 |
| WO | WO 94/23433 | | | 10/1994 |
| WO | WO 97/03954 | | | 2/1997 |
| WO | WO 97/45482 | | | 12/1997 |
| WO | WO 01/36536 | A1 | | 5/2001 |

OTHER PUBLICATIONS

"Plastic Additives Handbook, 5th Edition" Hans Zweifel, Ed., Carl Hanser Verlag Publishers, Munich, 2001. pp. 914-935.

"Preparation and Reactions of Epoxy-Modified Polyethylene", J. Appl. Poly. Sci., vol. 27, pp. 425-437 (1982).

* cited by examiner

CONDUCTIVE POLYPHENYLENE ETHER-POLYAMIDE COMPOSITION, METHOD OF MANUFACTURE THEREOF, AND ARTICLE DERIVED THEREFROM

BACKGROUND OF INVENTION

Polyphenylene ether resins have been modified with polyamide resins to provide a wide variety of beneficial properties such as heat resistance, chemical resistance, impact strength, hydrolytic stability and dimensional stability compared to either unmodified resin alone.

U.S. Pat. No. 4,923,924 to Grant et al. generally describes a composition comprising a polyamide, a carboxylated polyphenylene ether, and an impact modifier.

U.S. Pat. No. 5,109,052 to Kasai et al. generally describes a thermoplastic composition comprising a polyphenylene ether, a polyamide, and a specific block copolymer, wherein the PA forms a continuous phase, the PPE is dispersed in the PA, and the block copolymer is micro-dispersed in the PPE.

U.S. Pat. No. 5,977,240 to Marie Lohmeijer et al. generally describes a thermoplastic composition comprising (a) a compatibilized polyphenylene ether-polyamide base resin, and (b) 1–7 parts by weight per 100 parts by weight of (a) of an electroconductive carbon black, with an Izod notched impact strength of more than 15 $kJ/m^2$ and a volume resistivity of less than $10^6$ Ohm-cm.

U.S. Pat. No. 6,171,523 to Silvi et al. generally describes a method for the preparation of conductive polyphenylene ether-polyamide compositions, the method comprising melt blending polyphenylene ether, an unsaturated impact modifying polymer and a functionalizing compound in an initial step, optionally in combination with a portion of the polyamide, and subsequently melt blending with the remainder of the polyamide and conductive carbon black having a low volatiles content.

U.S. Pat. No. 6,221,283 to Dharmarajan et al. generally describes a method of making a conductive thermoplastic composition containing at least one dispersed phase polymer with a continuous phase polymer and at least one conductivity imparting agent, wherein the bulk resistivity of the composition is at least partially determined by the particle size of the dispersed phase within the continuous phase. The thermoplastic composition preferably comprises a compatibilized blend of at least one polyphenylene ether resin, at least one polyamide resin, and at least one conductivity imparting agent, and optionally, one or more of impact modifiers, stabilizers, antioxidants, lubricants, and fillers.

European Patent Application 627,466 A2 to Campbell et al. generally describes incorporation of high glass transition temperature polyphenylene ethers in immiscible polymer blends to yield increased heat deflection temperatures.

The use of compatibilized polyphenylene ether-polyamide compositions for painted automobile exterior parts has led to increased demands for high-temperature dimensional stability, so that molded parts can tolerate higher temperatures in paint-drying ovens. However, other physical properties, such as impact strength and electrical conductivity, cannot be compromised in the pursuit of improved thermal resistance. There therefore remains a need for polyphenylene ether-polyamide compositions exhibiting improved balances of thermal resistance, impact strength, and electrical conductivity.

SUMMARY OF INVENTION

The above-described and other drawbacks and disadvantages of the prior art are alleviated by a conductive thermoplastic composition comprising: about 20 to about 60 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units; about 30 to about 65 weight percent of a polyamide; and about 0.025 to about 40 weight percent of an electrically conductive filler; wherein all weight percents are based on the total weight of the composition.

Other embodiments, including a method of preparing the composition and articles comprising the composition or its reaction products, are described below.

DETAILED DESCRIPTION

One embodiment is a conductive thermoplastic composition comprising: about 20 to about 60 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units; about 30 to about 65 weight percent of a polyamide; and about 0.025 to about 40 weight percent of an electrically conductive filler; wherein all weight percents are based on the total weight of the composition.

It has now been unexpectedly discovered that compositions comprising particular polyphenylene ether copolymers and particular impact modifiers provide improved high-temperature dimensional stability, while maintaining conductivity and impact strength. The compositions are particularly useful in the manufacturing of electrostatically painted automotive exterior body panels, where paint oven temperatures may exceed 200° C.

The composition comprises a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units. Within the range of 2,6-dimethyl-1,4-phenylene ether units, it may be preferred that the copolymer comprise at least about 70 weight percent, more preferably at least about 80 weight percent. Also within the range of 2,6-dimethyl-1,4-phenylene ether units, it may be preferred that the copolymer comprise up to about 90 weight percent, more preferably up to about 85 weight percent. Within the range of 2,3,6-trimethyl-1,4-phenylene ether units, it may be preferred that the copolymer comprise at least about 12 weight percent, more preferably at least about 15 weight percent. Also within the range of 2,3,6-trimethyl-1,4-phenylene ether units, it may be preferred that the copolymer comprise up to about 22 weight percent, more preferably up to about 20 weight percent.

The polyphenylene ether copolymer comprising 2,6-dimethyl-1,4-phenylene ether units and 2,3,6-trimethyl-1,4-phenylene ether units may be prepared by polymerizing a mixture comprising corresponding amounts of 2,6-dimethylphenol and 2,3,6-trimethylphenol. The polyphenylene ether copolymer may also comprise up to about 35 weight percent of phenylene ether units derived from monohydric phenols other than 2,6-dimethylphenol and 2,3,6-trimethylphenol. Other monohydric phenols suitable for the preparation of the copolymer include, for example, 2,6-diethylphenol, 2-methyl-6-propylphenol, 2,6-di-n-propylphenol, 2-ethyl-6-propylphenol, 2,6-dilaurylphenol, 2,6-diphenylphenol, 2,6-dimethoxyphenol, 2,6-diethoxy-1,4-phenol, 2-methoxy-6-ethoxyphenol, 2-ethyl-6-stearyloxyphenol, 2,6-dichloro-1,4-phenol, 2-methyl-6-phenylphenol, 2-ethoxyphenol, 2-chlorophenol, 2,6-dibromophenol, 3-bromo-2,6-dimethylphenol, and the like, and combinations comprising at least one of the foregoing monohydric phenols.

In addition to the phenylene ether units described above, the polyphenylene ether copolymer may comprise up to 15 weight percent, based on the weight of the copolymer, of grafts of vinyl monomers or polymers such as polystyrenes and elastomers, as described in U.S. Pat. No. 5,089,566 to S. Bruce Brown. The polyphenylene ether copolymer may further comprise up to 15 weight percent, based on the weight of the copolymer, of the reaction products of coupling agents such as low molecular weight polycarbonates, quinones, heterocycles and formals, which have undergone reaction with the hydroxy groups of two phenyl ether chains to produce a high molecular weight polymer.

The polyphenylene ether copolymers may also have various end groups, such as amino alkyl containing end groups and 4-hydroxy biphenyl end groups, typically incorporated during synthesis by the oxidative coupling reaction. The polyphenylene ether resins may be functionalized or "capped" with end groups, which add further reactivity to the polymer and in some instances provide additional compatibility with other polymer resins that may be used to produce an alloy or blend. For instance, the polyphenylene ether may be functionalized with an epoxy end group, a phosphate end group, an acrylate or methacrylate end group, or an ortho ester end group by reacting the polyphenylene ether copolymer with functionalizing agents known in the art.

The polyphenylene ether copolymer may preferably have an intrinsic viscosity of about 0.2 to about 2.0 deciliters per gram (dL/g) as measured in chloroform at 25° C. Within this range, the polyphenylene ether copolymer may preferably have an intrinsic viscosity of at least about 0.25 dL/g, more preferably at least about 0.30 dL/g. Also within this range, the polyphenylene ether copolymer may preferably have an intrinsic viscosity of up to about 1.0 dL/g, more preferably up to about 0.7 dL/g, yet more preferably up to about 0.5 dL/g. The polyphenylene ether copolymers may preferably have a number average molecular weight of about 3,000 to about 40,000 atomic mass units (AMU) and a weight average molecular weight of about 5,000 to about 80,000 AMU, as determined by gel permeation chromatography using polystyrene standards.

The polyphenylene ether copolymers may be prepared by any of a number of processes known in the art from corresponding phenols or reactive derivatives thereof. Polyphenylene ethers are typically prepared by the oxidative coupling of at least one monohydric phenol. Catalysts systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide) ions and at least one amine such as cuprous chloride-trimethylamine. Catalyst systems that contain manganese compounds are generally alkaline systems in which divalent manganese is combined with such anions as halide, alkoxide or phenoxide. The manganese may be present as a complex with one or more complexing and/or chelating agents such as dialkylamines, alkylenediamines, o-hydroxy aromatic aldehydes, o-hydroxyazo compounds, and o-hydroxyaryl oximes. Suitable cobalt catalyst systems contain cobalt salts and an amine.

Examples of catalyst systems and methods for preparing polyphenylene ethers are described in, for example, U.S. Pat. Nos. 3,306,874, 3,306,875, 3,914,266 and 4,028,341 to Hay; U.S. Pat. Nos. 3,257,357 and 3,257,358 to Stamatoff; U.S. Pat. Nos. 4,011,200 and 4,038,343 to Yonemitsu et al.; U.S. Pat. No. 4,742,115 to Mawatari et al.; U.S. Pat. Nos. 4,806,297 and 4,935,472 to Brown et al.; U.S. Pat. No. 4,806,602 to White et al; European Patent Application No. 153,074 A2 to Kawaki et al.; European Patent Application No. 627,466 A2 to Campbell et al.

The polyphenylene ether copolymer may be random, graft, or block copolymer, although the use of random copolymers is presently preferred.

The composition may comprise the polyphenylene ether copolymer in an amount of about 20 to about 60 weight percent, based on the total weight of the composition. Within this range, the composition may comprise the polyphenylene ether copolymer in an amount of at least about 25 weight percent, more preferably at least about 30 weight percent. Also within this range, the composition may comprise the polyphenylene ether copolymer in an amount of up to about 50 weight percent, more preferably up to about 45 weight percent, even more preferably up to about 40 weight percent.

The polyamides used in the conductive compositions are obtained, for instance, by polymerizing various precursor having amino groups and carboxylic acid groups. Such precursors include, for example, a monoaminomonocarboxylic acid; a lactam of a monoaminomonocarboxylic acid having at least 2 carbon atoms between the amino and carboxylic acid group; substantially equimolar proportions of a diamine having at least 2 carbon atom between amino groups and a dicarboxylic acid; and the like; and combinations comprising at least one of the foregoing precursors. The dicarboxylic acid may exist in the form of a functional derivative such as, for example, an ester or an acid chloride. The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoaminomonocarboxylic acids or lactams thereof which are useful in preparing the polyamides include those compounds containing 2 to about 16 carbon atoms between the amino and carboxylic acid groups, said carbon atoms forming a ring with the —CO—NH— group in the case of a lactam. Suitable examples of aminocarboxylic acids and lactams are aminocaproic acid, butyrolactam, pivalolactam, caprolactam, capryl-lactam, enantholactam, undecanolactam, dodecanolactam, and 3-aminobenzoic acid, 4-aminobenzoic acid, and the like.

Diamines suitable for use in the preparation of the polyamides include straight chain and branched, alkyl, aryl and alkyl-aryl diamines. Such diamines include, for example, those represented by the general formula:

$$H_2N(CH_2)_nNH_2$$

wherein n is an integer of 2 to 16, such as trimethylenediamine, tetramethylenediamine, pentamethylenediamine, octamethylenediamine, hexamethylenediamine, trimethyl hexamethylene diamines, meta-phenylene diamine, metaxylene diamine, and the like.

The dicarboxylic acids may be aromatic, for example, isophthalic and terephthalic acids. Preferred dicarboxylic acids are of the formula:

HOOC—Y—COOH wherein Y represents a divalent aliphatic group containing at least 2 carbon atoms, and examples of such acids are sebacic acid, octadecanedoic acid, suberic acid, glutaric acid, pimelic acid, adipic acid, and the like.

Typical examples of polyamides (nylons) useful in conductive compositions include, for example, nylon 4,6, nylon 6, nylon 6,6, nylon 11, nylon 12, nylon 6,3, nylon 6,4, nylon 6,10, and nylon 6,12, as well as polyamides prepared from terephthalic acid and/or isophthalic acid and trimethyl hexamethylene diamine, polyamides prepared from adipic acid and meta xylylenediamines, polyamides prepared from adipic acid and/or azelaic acid and 2,2-bis-(p-aminocyclohexyl) propane, semi-crystalline polyamides resulting from combinations of terephthalic and/or isophthalic and/or adipic acids with hexamethylene diamine, semi-crystalline polyamides prepared from terephthalic and/or isophthalic acids and hexamethylene diamine and 2-methyl pentamethylene diamine, and polyamides prepared from terephthalic acid and 4,4'-diamino-dicyclohexylmethane. Mixtures and/or copolymers of two or more of the foregoing polyamides may also be used.

It is also understood that use of the term "polyamide" includes the toughened or super tough polyamides. Super tough polyamides or super tough nylons, as they are more commonly known, are available commercially, e.g., from E.I. duPont under the tradename ZYTEL® ST, or may be prepared according to methods described in, for example, U.S. Pat. No. 4,174,358 to Epstein, U.S. Pat. No. 4,474,927 to Novak, U.S. Pat. No. 4,346,194 to Roura, and U.S. Pat. No. 4,251,644 to Joffrion. These super tough nylons are prepared by blending one or more polyamides with one or more polymeric or copolymeric elastomeric toughening agents. Suitable toughening agents are disclosed in the above-identified U.S. patents, as well as in U.S. Pat. No. 3,884,882 to Caywood, Jr., and U.S. Pat. No. 4,147,740 to Swiger; and Gallucci et al., "Preparation and Reactions of Epoxy-Modified Polyethylene", J. Appl. Poly. Sci., Vol. 27, pp. 425–437 (1982). Typically, these elastomeric polymers and copolymers may be straight chain or branched as well as graft polymers and copolymers, including core-shell graft copolymers, and they are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The composition may comprise the polyamide in an amount of about 30 to about 65 weight percent, based on the total weight of the composition. Within this range, the polyamide amount may preferably be as least about 35 weight percent, more preferably at least about 40 weight percent, still more preferably at least about 45 weight percent. Also within this range, the polyamide amount may preferably be up to about 55 weight percent, more preferably up to about 50 weight percent.

In a preferred embodiment, the polyamide comprises nylon 6 (poly(pentamethylene carboximide)) and nylon 6,6 (poly(hexamethylene adipamide)). In this embodiment, the nylon 6 amount may be about 3 weight percent to about 17 weight percent, based on the total weight of the composition. Within this range, the nylon 6 amount may preferably be at least about 7 weight percent. Also within this range, the nylon 6 amount may preferably be up to about 13 weight percent. In this embodiment, the nylon 6,6 amount may be about 25 weight percent to about 51 weight percent. Within this range, the nylon 6,6 amount may preferably be at least about 32 weight percent, more preferably at least about 35 weight percent. Also within this range, the nylon 6,6 amount may preferably be up to about 44 weight percent, more preferably up to about 41 weight percent.

The composition comprises an electrically conductive filler. Suitable electrically conductive fillers include carbon black, carbon fibers, vapor grown carbon fibers, carbon nanotubes, metal fillers, conductive non-metal fillers, metal-coated fillers, and the like, and combinations comprising at least one of the foregoing electrically conductive fillers. The composition may contain the electrically conductive filler in an amount of about 0.025 to about 40 weight percent, based on the total weight of the composition. Selection of a particular amount, which depends on factors including the type of electrically conductive filler and the desired properties of the composition, may be made by one of ordinary skill in the art without undue experimentation.

Preferred carbon blacks include those having average particle sizes less than about 200 nanometers (nm), preferably less than about 100 nm, more preferably less than about 50 nm. Preferred carbon blacks may also have surface areas greater than about 200 square meter per gram ($m^2/g$), preferably greater than about 400 $m^2/g$, yet more preferably greater than about 1000 $m^2/g$. Preferred carbon blacks may have a pore volume (measured by dibutyl phthalate absorption) greater than about 40 cubic centimeters per hundred grams ($cm^3/100$ g), preferably greater than about 100 $cm^3/100$ g, more preferably greater than about 150 $cm^3/100$ g. Exemplary carbon blacks include the carbon black commercially available from Columbian Chemicals under the trade name CONDUCTEX®; the acetylene black available from Chevron Chemical, under the trade names S.C.F. (Super Conductive Furnace) and E.C.F. (Electric Conductive Furnace); the carbon blacks available from Cabot Corporation under the trade names VULCAN® XC72 and BLACK PEARLS®; and the carbon blacks commercially available from Akzo Co. Ltd under the trade names KETJEN BLACK® EC 300 and EC 600. When the electrically conductive filler comprises carbon black, the carbon black may be used in an amount of about 0.1 to about 20 weight percent, based on the total weight of the composition. Within this range, it may be preferred to use a carbon black amount of at least about 0.5 weight percent, more preferably at least about 1.1 weight percent. Also within this range, it may be preferred to use a carbon black amount of up to about 10 weight percent, more preferably up to about 5 weight percent, even more preferably up to about 2.5 weight percent.

The electrically conductive filler may comprise graphitic or partially graphitic carbon fibers, also referred to as vapor grown carbon fibers (VGCF), having diameters of about 3.5 to about 500 nanometers (nm) and an aspect of at least about 5. When VGCF are used, diameters of about 3.5 to about 70 nm are preferred, with diameters of about 3.5 to about 50 nm being more preferred. It is also preferable to have average aspect ratios of at least about 100, more preferably at least about 1000. Representative VGCF and methods for their preparation are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No.

5,589,152 to Tennent et al.; and U.S. Pat. No. 5,591,382 to Nahass et al. When the electrically conductive filler comprises VGCF, the VGCF may be used in an amount of about 0.05 to about 10 weight percent, based on the total weight of the composition. Within this range, the VGCF amount may preferably be at least about 0.1 weight percent, more preferably at least about 0.2 weight percent. Also within this range, the VGCF amount may preferably be up to about 5 weight percent, more preferably up to about 2 weight percent, yet more preferably up to about 1 weight percent.

The electrically conductive filler may comprise carbon nanotubes. Carbon nanotubes may consist of a single wall, wherein the tube diameter is about 0.7 to about 2.4 nm, or have multiple, concentrically-arranged walls wherein the tube diameter is about 2 to about 50 nm. When carbon nanotubes are used it is preferred to have an average aspect ratio greater than or equal to about 5, preferably greater than or equal to about 100, more preferably greater than or equal to about 1000. Representative carbon nanotubes and their preparation are described, for example, in U.S. Pat. No. 5,591,312 to Smalley, U.S. Pat. Nos. 5,591,832 and 5,919,429 to Tanaka et al., U.S. Pat. No. 5,641,455 to Ebbesen et al., U.S. Pat. No. 5,830,326 to Iijima et al., and U.S. Pat. No. 6,183,714 to Smalley et al. Suitable preparation methods include laser ablation and carbon arc methods. When the electrically conductive filler comprises carbon nanotubes, the carbon nanotube may be used in an amount of about 0.025 weight percent to about 10 weight percent, based on the total weight of the composition. Within this range, it may be preferred to use a carbon nanotube amount of at least about 0.05 weight percent, more preferably at least about 0.1 weight percent. Also within this range, it may be preferred to use a carbon nanotube amount of up to about 5 weight percent, more preferably up to about 1 weight percent.

The electrically conductive filler may comprise carbon fibers, such as the conductive carbon fibers known for use in modifying the electrostatic discharge (ESD) properties of polymeric resins. Various types of conductive carbon fibers are known in the art and classified according to their diameter, morphology, and degree of graphitization (morphology and degree of graphitization being interrelated). The carbon fibers may, for example, have a diameter of about 3 micrometers to about 15 micrometers. The carbon fibers may have graphene ribbons parallel to the fiber axis (in radial, planar, or circumferential arrangements. The carbon fibers may be produced commercially by pyrolysis of organic precursors such as phenolics, polyacrylonitrile (PAN), or pitch. The carbon fibers are generally chopped, having an initial length (before compounding) of about 0.05 to about 5 centimeters. Unchopped carbon fibers may also be used. Fibers may be sized or unsized. Sized fibers are conventionally coated on at least a portion of their surfaces with a sizing composition selected for compatibility with the polymeric thermoplastic matrix material. The sizing composition facilitates wet-out and wet-through of the matrix material on the fiber strands and assists attaining desired physical properties in the composite. Suitable carbon fibers are commercially available as, for example, FORTAFIL® CA and FORTAFIL® CM available from Fortafil Fibers, Inc., ZOLTEK® HT available from Zoltek Corporation, Toray TORAYCA® available from Toray Industries Inc., and GRAFIL® fibers available from Mitsubishi Rayon.

When the electrically conductive filler comprises carbon fibers, the carbon fibers may be used in an amount of about 2 to about 40 weight percent, based on the total weight of the composition. Within this range, the carbon fiber amount may preferably be at least about 4 weight percent, more preferably at least about 6 weight percent. Also within this range, the carbon fiber amount may preferably be up to about 30 weight percent, more preferably up to about 20 weight percent, still more preferably up to about 10 weight percent.

The electrically conductive filler may comprise conductive metal fillers. These may be electrically conductive metals or alloys that do not melt under conditions of preparing the composition, fabricating finished articles from the composition, or intended use of articles prepared from the composition. Suitable metal fillers may comprise aluminum, copper, magnesium, chromium, tin, nickel, silver, iron, titanium, and the like, combinations comprising at least one of the foregoing metals, and alloys (such as stainless steels, bronzes, and the like) comprising at least one of the foregoing metals. The metal fillers may also comprise intermetallic chemical compounds, such as borides (e.g., titanium diboride) and carbides of the above metals. Conductive non-metal fillers may comprise tin-oxide, indium tin oxide, and the like. The conductive metal fillers and conductive non-metal fillers may exist in the form of powder, drawn wires, strands, fibers, tubes, nanotubes, flakes, laminates, platelets, ellipsoids, discs, and other geometries known in the art. When the electrically conductive filler comprises conductive metal fillers or conductive non-metal fillers, these filler may be used in an amount of about 1 weight percent to about 40 weight percent, based on the total weight of the composition. Within this range, it may be preferred to use an amount of the conductive metal fillers and/or conductive non-metal fillers of at least about 1.5 weight percent, more preferably at least about 2 weight percent. Also within this range, it may be preferred to use an amount of the conductive metal fillers and/or conductive non-metal fillers of up to about 30 weight percent, more preferably at least about 20 weight percent, yet more preferably up to about 15 weight percent.

The electrically conductive filler may comprise metal-coated fillers. Metal-coated fillers are herein defined as non-conductive, non-metallic fillers that have been coated over a substantial portion of their surface with a coherent layer of conductive metal. Typical conductive metals include those described above in associated with conductive metal fillers. Examples of substrates are well known in the art and include those described in "Plastic Additives Handbook, 5$^{th}$ Edition" Hans Zweifel, Ed., Carl Hanser Verlag Publishers, Munich, 2001. Examples of such substrates include silica powder (such as fused silica and crystalline silica), boron-nitride powder, boron-silicate powders, alumina, magnesium oxide (magnesia), wollastonite (including surface-treated wollastonite), calcium sulfate (as its anhydride, dihydrate or trihydrate), calcium carbonate (including chalk, limestone, marble, synthetic precipitated calcium carbonates, generally in the form of a ground particulates), talc (including fibrous, modular, needle shaped, and lamellar talc), glass spheres (both hollow and solid), kaolin (including hard, soft, calcined kaolin, and kaolin comprising various coatings known in the art to facilitate compatibility with the polymeric matrix resin), mica, feldspar, silicate spheres, flue dust, cenospheres, finite, aluminosilicate (armospheres), natural silica sand, quartz, quartzite, perlite, tripoli, diatomaceous earth, synthetic silica, and mixtures comprising any one of the foregoing. The substrates may be coated with a solid layer of conductive metal covering about 5 percent to 100 percent of the substrate surface area. The surface area may be determined by commonly known methods such as BET (Brunauer, Emmett, and Teller) nitrogen adsorption or mercury porosimetry. When the electrically conductive filler comprises metal-coated fillers, the metal-coated fillers may be used in an amount of about 1 to about 40 weight percent, based on the total weight of the composition. Within this range, the metal-coated fillers may be used in an amount of at least about 1.5 weight percent, more preferably at least about 2 weight percent. Also within this range, the metal-coated fillers may be used in an amount of up to about 30 weight percent, more preferably up to about 20 weight percent.

In one embodiment, the electrically conductive filler is provided in the form of a masterbatch in a thermoplastic resin that is compatible with at least one phase of the composition. Preferably, the masterbatch comprises the polyamide. Masterbatches containing electrically conductive fillers may be prepared according to known methods such as those described, for example, in U.S. Pat. No. 5,643,502 to Nahass et al. Masterbatches are also commercially available as, for example, the VGCF masterbatches in nylon 6, nylon 6,6, and nylon 12 from Hyperion Catalysis International, and the conductive carbon black masterbatch in nylon 6 available as CABELEC® 3178 from Cabot Corp.

The compositions may, optionally, comprise an impact modifier. Suitable impact modifiers include natural and synthetic elastomeric polymers, including the polymerization products of such monomers as olefins (e.g., ethylene, propylene, 1-butene and 4-methyl-1-pentene), alkenylaromatic monomers (e.g., styrene and alpha-methylstyrene), conjugated dienes (e.g., butadiene, isoprene, and chloroprene), and vinylic carboxylic acids and their derivatives (e.g., vinyl acetate, acrylic acid, alkylacrylic acids, alkyl acrylates such as methyl acrylate, alkyl methacrylates such as methyl methacrylate, and acrylonitrile). The polymerizaton products include homopolymers and random, block, radial block, graft, and core-shell copolymers, as well as combinations thereof.

Particularly useful impact modifiers include A-B (diblock) and A-B-A (triblock) copolymers of alkenyl aromatic compounds and conjugated diene compounds. Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred. Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene. The conjugated diene blocks may be partially or entirely hydrogenated, whereupon they may be represented as containing polyolefin blocks.

Examples of A-B and A-B-A block copolymers include styrene-butadiene diblock copolymers, styrene-(ethylene-propylene) diblock copolymers, styrene-isoprene diblock copolymers, alpha-methylstyrene-butadiene diblock copolymers, styrene-butadiene-styrene triblock copolymers, styrene-(ethylene-butylene)-styrene triblock copolymers, styrene-isoprene-styrene triblock copolymers, alpha-methylstyrene-butadiene-alpha-methylstyrene triblock copolymers, and the like, and combinations comprising at least one of the foregoing impact modifiers. The A-B and A-B-A block copolymers may preferably have a glass transition temperature ($T_g$) less than about −20° C., more preferably less than about −40° C. Such A-B and A-B-A block copolymers are available commercially as, for example, the styrene-(ethylene-propylene) diblock copolymer having a styrene content of 37 weight percent available from Kraton Polymers as KRATON® G1701; the styrene-(ethylene-butylene)-styrene triblock copolymer having a styrene content of 30 weight percent available from Kraton Polymers as KRATON® G1651; the styrene-(ethylene-propylene) diblock copolymer available from Kuraray as SEPTON® 1001; and the styrene-(ethylene-butylene)-styrene triblock copolymers available from Kuraray as SEPTON® 8006 and from Repsol as CALPRENE® 6170P. Other A-B and A-B-A block copolymers include those available under the tradename SOLPRENE® from Phillips Petroleum and under the tradename VECTOR®0 from Dexco.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers, thermoplastic ether-ester elastomers, and the like, as well as mixtures comprising any one of the foregoing. Specially preferred ionomer resins include those sold under the trade name SURLYN® by DuPont.

When the composition comprises an impact modifier, it may be present in an amount of about 1 to about 30 weight percent, based on the total weight of the composition. Within this range, it may be preferred to use the impact modifier in an amount of at least about 2 weight percent, more preferably at least about 5 weight percent. Also within this range, it may be preferred to use the impact modifier in an amount of up to about 25 weight percent, more preferably up to about 20 weight percent.

The composition may comprise a combination of two or more of the above described impact modifiers. In one embodiment, the composition comprises about 2 to about 26 weight percent of an impact modifier selected from the group consisting styrene-(ethylene-butylene)-styrene triblock copolymers, styrene-(ethylene-propylene) diblock copolymers, and combinations comprising at least one of the foregoing impact modifiers.

In a preferred embodiment, the composition comprises a styrene-(ethylene-propylene) diblock copolymer and a styrene-(ethylene-butylene)-styrene triblock copolymer. In this embodiment, the styrene-(ethylene-propylene) diblock copolymer may be used in an amount of about 1 to about 13 weight percent. Within this range, the styrene-(ethylene-propylene) diblock copolymer amount may preferably be at least about 4 weight percent. Also within this range, the styrene-(ethylene-propylene) diblock copolymer amount may preferably be up to about 10 weight percent. Also in this embodiment, the styrene-(ethylene-butylene)-styrene triblock copolymer may be used in an amount of about 1 to about 13 weight percent. Within this range, the styrene-(ethylene-butylene)-styrene triblock copolymer amount may preferably be at least about 4 weight percent. Also within this range, the styrene-(ethylene-butylene)-styrene triblock copolymer amount may preferably be up to about 10 weight percent.

The composition may, optionally, comprise a compatibilizing agent to improve the physical properties of the polyphenylene ether-polyamide resin blend, as well as to enable the use of a greater proportion of the polyamide component. When used herein, the expression "compatibilizing agent" refers to those polyfunctional compounds which interact with the polyphenylene ether, the polyamide, or, preferably, both. This interaction may be chemical (e.g. grafting) or physical (e.g. affecting the surface characteristics of the dispersed phases). In either case the resulting polyphenylene ether-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatible without such agents, as taught, for example, in U.S. Pat. No. 3,379,792.

Suitable compatibilizing agents include, for example, liquid diene polymers, epoxy compounds, oxidized polyolefin wax, quinones, organosilane compounds, polyfunctional compounds, and functionalized polyphenylene ethers obtained by reacting one or more of the previously mentioned compatibilizing agents with polyphenylene ether.

Liquid diene polymers suitable for use as compatibilizing agents include homopolymers of a conjugated diene and copolymers of a conjugated diene with at least one monomer selected from other conjugated dienes; vinyl monomers, such as styrene and alpha-methyl styrene; olefins, such as ethylene, propylene, butene-1, isobutylene, hexene-1, octene-1, and dodecene-1, and mixtures thereof. The liquid diene polymers may have a number average molecular weight of about 150 atomic mass units (AMU) to about 10,000 AMU, preferably about 150 AMU to about 5,000 AMU. These homopolymers and copolymers can be produced by the methods described in, for example, U.S. Pat. Nos. 3,428,699, 3,876,721, and 4,054,612. Specific examples of liquid diene polymers include polybutadiene, polyisoprene, poly (1,3-pentadiene), poly(butadiene-isoprene), poly(styrene-butadiene), polychloroprene, poly (butadiene-alpha methylstyrene), poly(butadiene-styrene-isoprene), poly(butylene-butadiene), and the like, and combinations comprising at least one of the foregoing liquid diene polymers.

Epoxy compounds suitable for use as compatibilizing agents include epoxy resins produced by condensing polyhydric phenols (e.g., bisphenol-A, tetrabromobisphenol-A, resorcinol and hydroquinone) and epichlorohydrin; epoxy resins produced by condensing polyhydric alcohols (e.g., ethylene glycol, propylene glycol, butylene glycol, polyethylene glycol, polypropylene glycol, pentaerythritol and trimethylolethane and the like) and epichlorohydrin, glycidyl etherified products of monohydric alcohols and monohydric phenols, such as phenyl glycidylether, butyl glycidyl ether and cresyl glycidylether; glycidyl derivates of amino compounds, such as the diglycidyl derivate of aniline; epoxidized products of higher olefinic or cycloalkene, or natural unsaturated oils (e.g., soybean oil) as well as of the foregoing liquid diene polymers; combinations comprising at least one of the foregoing epoxy compounds; and the like.

Oxidized polyolefin waxes suitable for use as compatibilizing agents are well known and described, for example, in U.S. Pat. Nos. 3,756,999 and 3,822,227. Generally, these are prepared by an oxidation or suspension oxidation of polyolefin. An especially preferred oxidized polyolefin wax is "Hoechst Wachs".

Quinone compounds suitable for use as compatibilizing agents are characterized as having at least one six-membered carbon ring; at least two carbonyl groups, which may be in the same or different six-membered carbon rings, provided that they occupy positions corresponding to the 1,2- or 1,4-orientation of the monocyclic quinone; and at least two carbon-carbon double bonds in the ring structure, the carbon-carbon double bounds and carbonyl carbon-oxygen double bonds being conjugated with respect to each other. Where more than one ring is present in the unsubstituted quinone, the rings may be fused, non-fused, or both: non-fused rings may be bound by a direct carbon-carbon double bond or by a hydrocarbon radical having conjugated unsaturation such as —C═C—C═C—.

The quinones may be substituted or unsubstituted. In substituted quinones, the degree of substitution may be from one to the maximum number of replaceable hydrogen atoms. Exemplary substituents include halogen (e.g. chlorine, bromine, fluorine, etc.), hydrocarbon radicals including branched and unbranched alkyl, cycloalkyl, olefinically unsaturated hydrocarbon radicals, aryl, alkylaryl, and halogenated derivatives thereof; and similar hydrocarbons having heteroatoms therein, particularly oxygen, sulfur, or phosphorous, and wherein the heteroatom connects the radical to the quinone ring (e.g., alkoxyl). Examples of specific quinones include 1,2-benzoquinone, 1,4-benzoquinone, 2,2'-diphenoquinone, 4,4'-diphenoquinone, 2,2',6,6'-tetramethyl-4,4'-diphenoquinone, 1,2-naphthoquinone, 1,4-naphthoquinone, 2,6-naphthoquinone, chloranils, 2-chloro-1,4-benzoquinone, 2,6-dimethyl-1,4-benzoquinone, combinations comprising at least one of the foregoing quinones, and the like.

Organosilane compounds suitable as compatibilizing agents are characterized as having at least one silicon atom bonded to a carbon through an oxygen link and at least one carbon-carbon double bond or carbon-carbon triple bond and/or a functional group selected from an amine group or a mercapto group, provided that the functional group is not directly bonded to the silicon atom. In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g., oxygen). Additionally, there may also be more than one silicon atom in the compound, such multiple silicon atoms, if present, being linked through an oxygen link (e.g., siloxanes); a silicon-silicon bond; or a divalent hydrocarbon radical (e.g., methylene or phenylene groups); or the like. Examples of suitable organosilane compounds include gamma-aminopropyltriethoxysilane, 2-(3-cyclohexanyl)ethyltrimethoxysilane, 1,3-divinyltetraethoxysilane, vinyl-tris-(2-methoxyethoxy)silane, 5-bicycloheptenyltriethoxysilane, and gamma-mercaptopropyltrimethoxysilane.

Polyfunctional compounds suitable as compatibilizing agents include three types. The first type of polyfunctional compounds are those having in the molecule both a carbon-carbon double bond or a carbon-carbon triple bond and at least one carboxylic acid, anhydride, amide, ester, imide, amino, epoxy, orthoester, or hydroxy group. Examples of such polyfunctional compounds include maleic acid, maleic anhydride, fumaric acid, glycidyl acrylate, itaconic acid, aconitic acid, maleimide, maleic hydrazide, reaction products resulting from a diamine and maleic anhydride, dichloro maleic anhydride, maleic acid amide, unsaturated dicarboxylic acids (e.g. acrylic acid, butenoic acid, methacrylic acid, ethylacrylic acid, pentenoic acid), decenoic acids, undecenoic acids, dodecenoic acids, linoleic acid, esters of the foregoing unsaturated carboxylic acids, acid amides of the foregoing unsaturated carboxylic acids, anhydrides of the foregoing unsaturated carboxylic acids, unsaturated alcohols (e.g. alkyl alcohol, crotyl alcohol, methyl vinyl carbinol, 4-pentene-1-ol, 1,4-hexadiene-3-ol, 3-butene- 1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing from replacing the —OH group(s) of the above unsaturated alcohols with $NH_2$ groups, functionalized diene polymers and copolymers, and the like. Of these, two of the preferred compatibilizing agents for compositions of the present invention are maleic anhydride and fumaric acid.

The second group of polyfunctional compounds have both (a) a group represented by the formula (OR) wherein R is hydrogen or an alkyl, aryl, acyl, or carbonyl dioxy group, and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula:

$$(R^IO)_mR(COOR^{II})_n(CONR^{III}R^{IV})_s$$

wherein R is a linear or branched chain, saturated aliphatic hydrocarbon of from 2 to 20, preferably 2 to 10, carbon atoms; $R^I$ is hydrogen or an alkyl, aryl, acyl or carbonyl dioxy group of 1 to 10, preferably 1 to 6, more preferably 1 to 4, carbon atoms, especially preferred is hydrogen; each $R^{II}$ is independently hydrogen or an alkyl or aryl group from 1 to 20 carbon atoms, preferably from 1 to 10 carbon atoms; each $R^{III}$ and $R^{IV}$ are independently hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid, and the like; including the various commercial forms thereof, such as for example, the anhydrous and hydrated acids. Of these, citric acid is another of the preferred compatibilizing agents. Illustrative of esters useful herein include, for example, acetyl citrate and mono- and/or distearyl citrates and the like. Suitable amides useful herein include, for example, N,N'-diethyl citric acid amide, N-phenyl citric acid amide, N-dodecyl citric acid amide, N,N'-didodecyl citric acid amide, and N-dodecyl malic acid. Especially preferred derivates are the salts thereof, including the salts with amines and, preferably, the alkali and alkaline earth metal salts. Exemplary of suitable salts include calcium malate, calcium citrate, potassium malate, and potassium citrate.

The third group of polyfunctional compounds have both (a) an acid halide group, most preferably an acid chloride group and (b) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. Among these, trimellitic anhydride acid chloride is preferred. Furthermore, it is especially preferred that compatibilizers of this group be prereacted with at least a portion of the polyphenylene ether whereby the compatibilizing agent is a polyphenylene ether-functionalized compound.

Preferred compatibilizing agents include citric acid, maleic acid, maleic anhydride, malic acid, fumaric acid, and the like, and combinations comprising at least one of the foregoing compatibilizing agents.

The above and other compatibilizing agents are more fully described in U.S. Pat. Nos. 4,315,086; 4,600,741; 4,642,358; 4,826,933; 4,866,114; 4,927,894; 4,980,424; 5,041,504; and 5,115,042.

The foregoing compatibilizing agents may be used alone or in various combinations of one another with another. Furthermore, they may be added directly to the melt blend or pre-reacted with either or both the polyphenylene ether and polyamide, as well as with other resinous materials employed in the preparation of the compositions of the present invention. With many of the foregoing compatibilizing agents, particularly the polyfunctional compounds, even greater improvement in compatibility is found where at least a portion of the compatibilizing agent is pre-reacted, either in the melt or in a solution of a suitable solvent, with all or a part of the polyphenylene ether. It is believed that such pre-reacting may cause the compatibilizing agent to react with the polymer and, consequently, functionalize the polyphenylene ether as noted above. For example, the polyphenylene ether may be pre-reacted with maleic anhydride to form an anhydride functionalized polyphenylene ether that has improved compatibility with the polyamide compared to a non-functionalized polyphenylene ether.

Where the compatibilizing agent is employed in the preparation of the compositions of the present invention, the initial amount used will be dependent upon the specific compatibilizing agent chosen and the specific polymeric system to which it is added. Typically, the compatibilizing agent may be present in an amount of about 0.05 weight percent to about 5 weight percent. Within this range, the compatibilizing agent amount may preferably be at least about 0.1 weight percent, more preferably at least about 0.3 weight percent, yet more preferably at least about 0.5 weight percent. Also within this range, it may be preferred to use a compatibilizing agent amounts up to about 2 weight percent, more preferably up to about 1 weight percent, based on the total weight of the composition.

The composition may, optionally, further comprise additives including stabilizers, antioxidants, antiozonants, mold release agents, dyes, pigments, UV stabilizers, non-conductive fillers, viscosity modifiers, and the like, and combinations comprising at least one of the foregoing additives.

In one embodiment, the composition comprises a stabilizer comprising about 0.05 to about 1.0 weight percent of pentaerythritol tetrakis(3-laurylthiopropionate) (PELTP). This stabilizer may be prepared according to methods described in, for example, U.S. Pat. Nos. 4,226,991, 4,774, 355, 5,055,606, 5,057,622, 5,198,486, and Patent Cooperation Treaty International Patent Application Nos. WO 9703954 and WO 9745482. PELTP may also be obtained commercially as, for example, SANDOSTAB® 4020 from Clariant.

In one embodiment, the composition comprises about 30 to about 45 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units; about of 30 to 65 weight percent of a polyamide selected from the group consisting of nylon 6,6, nylon 6, and mixtures thereof; about 5 to about 20 weight percent of an impact modifier; about 0.5 to about 5 weight percent of an electrically conductive filler selected from the group comprising a conductive carbon black, vapor grown carbon fibers, and mixtures thereof; and about 0.1 to about 5 weight percent a compatibilizing agent selected from the group consisting of citric acid, maleic acid, maleic anhydride, malic acid, fumaric acid, and combinations comprising at least one of the foregoing compatibilizing agents; wherein all weight percents are based on the total weight of the composition.

In another embodiment, the composition comprises about 32 to about 38 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units; about 35 to about 40 weight percent of nylon 6,6; about 8 to about 12 weight percent of nylon 6; about 5 to about 10 weight percent of a styrene-(ethylene-butadiene)-styrene triblock copolymer; about 5 to about 10 weight percent of a styrene-(ethylene-propylene) diblock copolymer; about 1.0 to about 2.5 weight percent of a conductive carbon black; and about 0.3 to about 1.1 weight percent of citric acid; wherein all weight percents are based on the total weight of the composition.

The composition may preferably exhibit a Notched Izod impact strength of at least about 15 MPa, more preferably at least about 19 MPa, yet more preferably at least about 22 MPa, measured at 23° C. according to ASTM D256.

To facilitate electrostatic painting of molded parts, the composition may preferably exhibit a specific volume resistivity up to about $10^5$ ohm-cm, more preferably up to about $10^4$ ohm-cm, yet more preferably about $10^3$ to about $10^4$ ohm-cm. Specific volume resistivities were measured as described in detail in the example section, below (see EXAMPLES 2–33, COMPARATIVE EXAMPLES 3–7).

There is no particular limitation on the method used to prepare the composition. In general, the composition may be prepared by melt blending about 30 to about 60 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units, about 30 to about 65 weight percent of a polyamide, and about 0.025 to about 40 weight percent of an electrically conductive filler, wherein all weight percents are based on the total weight of the composition.

In a preferred method, the polyphenylene ether copolymer may be dry blended with the compatibilizing agents, the antioxidant, and the impact modifier and fed into the feed throat of an extruder; the polyamide and the electrically conductive filler may then be added into the extruder further downstream through a side feeder. In another preferred method, the polyphenylene ether copolymer may be fed along with the polyamide, the compatibilizing agent, the antioxidant, the impact modifier, and the electrically conductive filler through the feed throat of the extruder. The electrically conductive filler may be first compounded into a masterbatch and then fed into the extruder for incorporation into the conductive composition.

It is generally preferred to use a twin screw extruder and to feed the polyphenylene ether copolymer resin and the polyamide sequentially into the extruder, with the polyphenylene ether copolymer resin being fed into the feed throat and the polyamide being fed further downstream through a side feeder. The temperature of the extruder may generally be raised to any temperature above the melting point of the polyphenylene ether resin and the polyamide resin, and it is preferable to employ processing temperatures of at least about 295° C. The conductive composition emerging from the extruder may be quenched under water and pelletized for use in other finishing or forming operations.

While it is generally desirable to use an extruder to melt blend the various ingredients listed above, other melt blending equipment may be used, including roll mills, Helicones, Buss kneaders, dough mixers, and the like. It is generally desirable to use temperatures and pressures during the melt blending step so as to obtain domains of the dispersed phase having an average particle size of about 0.1 to about 10 micrometers. Within this range, the average dispersed phase particle size may preferably be at least about 0.2 micrometers, more preferably at least about 0.3 micrometers. Also within this range, the average dispersed phase particle size may preferably be up to about 5 micrometers, more preferably up to about 2 micrometers.

In a preferred embodiment, the polyphenylene ether copolymer resin may be dry blended with the impact modifier, the antioxidant, the mold release agent, and the compatibilizing agents in a Henschel high speed mixer. The dry blended mixture may then be fed into the throat of a twin-screw extruder. The polyamide resin comprising nylon 6 and nylon 6,6 may be fed into the twin-screw extruder through a side feeder. Conductive carbon black may also be fed into the extruder through a side feeder. The temperature and speed of the extruder are adjusted to be such that the polyphenylene ether copolymer resin and the polyamide resin are melted and mixed so as to obtain a dispersed phase with particle sizes as specified above. The conductive composition may then be pelletized.

Articles made from the conductive compositions can be used in the automotive industry and in other applications where high temperatures are commonly encountered such as in electronics and computer related applications. The composition is particularly suitable for molding automobile exterior panels suitable for electrostatic painting.

The invention is further illustrated by the following non-limiting examples.

EXAMPLE 1

Comparative Examples 1 and 2

Three batches of the conductive composition were prepared according to the compositions given in Table 1. All amounts are expressed in weight percent, based on the total weight of the composition. Comparative Examples 1 and 2 used the polyphenylene ether homopolymer poly(2,6-dimethyl-1,4-phenylene ether) obtained from General Electric Company as PPE 803 having an intrinsic viscosity of 0.4 dL/g as measured in chloroform at 25° C. Example 1 used a polyphenylene ether copolymer having an intrinsic viscosity of 0.365 dL/g, a 2,6-dimethyl-1,4-phenylene ether content of 82 weight percent, and a 2,3,6-trimethyl-1,4-phenylene ether content of 18 weight percent.

The nylon 6 was obtained as SNIAMID® ASN 32–35 from Rhodia. The nylon 6,6 was obtained as 24FE1 from Rhodia. The styrene-(ethylene-butylene)-styrene (SEBS) rubber was obtained as KRATON® G1651 from Kraton Polymers having a styrene content of 37% and a weight average molecular weight ($M_W$) of 267,500 AMU. The conductive carbon black as obtained as KETJENBLACK® EC 600 JD from Akzo Nobel having a pore volume (DBP) of 480–510 mL/100 g. The styrene-(ethylene-propylene)

(SEP) rubber was obtained as KRATON® G1701 from Kraton Polymers having a styrene content of 30% and a weight average molecular weight of 152,400. The antioxidant 3,5-di-tert-butyl-4-hydroxy-hydrocinnamic acid, tetraester with pentaerythritol (Chemical Abstract Registry No. 6683-19-8) was obtained as IRGANOX® 1010 from Ciba-Geigy. The antioxidant 3,5-di-tert-butyl-4-hydroxy-hydrocinnamic acid, octadecyl ester (Chemical Abstracts Registry No. 2082-79-3) was obtained as IRGANOX® 1076 from Ciba-Geigy. The antioxidant N,N'-hexamethylenebis(3,5-di-tert-butyl-4-hydroxyhydrocinnamamide) (Chemical Abstracts Registry No. 23128-74-7) was obtained as IRGANOX® 1098 from Ciba-Geigy. The stabilizer pentaerythritol tetrakis(3-laurylthiopropionate) (PELTP) was obtained as SANDOSTAB® 4020 from Clariant.

The composition was prepared by first dry blending the polyphenylene ether resin with the compatibilizing agent, antioxidant, impact modifier, and PELTP. The dry blended mixture was then fed into the throat of a 30 mm twin-screw extruder having ten barrels or heating zones. The temperature of the individual zones was set at 275° C., 295° C., 295° C., 295°C., 295° C., 295°C., 295° C., 295°C., 295° C. and 295° C. respectively. The die temperature was also set at 295° C. The extruder screw speed was set at 400 rpm. The nylon 6 and nylon 6,6 pellets were first dry blended and fed into the extruder through a side feeder at barrel 7 of a 13 barrel extruder, along with the conductive carbon black. The melt blended conductive composition emerging from the extruder in the form a strand was quenched and pelletized.

The pellets were then dried and injection molded into specimens for tests, the results of which are shown in Tables 2 and 3. Notched Izod was measured at 23° C. according to ISO 180/1A. Tensile modulus was measured at 23° C. according to ASTM ISO 527. Tensile strength at yield was measured at 23° C. according to ISO 527. Dynatup (falling dart) energy at break was measured at 23° C. and 4.4 meter per second according to ISO 6603-2. Melt viscosity (MV) was measured at 282° C. and 1500 $sec^{-1}$ according to DIN 54811. Vicat-B softening temperature was measured according to ISO 306.

In addition, automotive fenders for a Renault R5 were successfully molded from all three compositions in order to compare the thermal resistance and impact strength as measured on standard test samples with those measured on actual automotive fenders. Test results for the R5 fenders are shown in Table 3. To achieve a rating of “OK” for the dimensional heat performance at a given temperature, the fender must exhibit a hood gap change less than 1 millimeter and an inward movement of the wheelarc after electrostatic painting of less than 3 millimeters.

TABLE 1

| | Comp. Ex. 1 | Comp. Ex. 2 | Ex. 1 |
|---|---|---|---|
| polyphenylene ether homopolymer | 34.09 | 36.64 | |
| polyphenylene ether copolymer | — | — | 35 |
| SEBS rubber | 7 | 7 | 7 |
| SEP rubber | 8 | 5.5 | 7 |
| Citric Acid | 0.7 | 0.65 | 0.7 |
| IRGANOX ® 1076 | 0.3 | 0.3 | — |
| KI, 50% in $H_2O$ | 0.1 | 0.1 | — |
| CuI | 0.01 | 0.01 | — |
| IRGANOX ® 1010 | — | — | 0.3 |
| IRGANOX ® 1098 | — | — | 0.1 |
| PELTP | — | — | 0.1 |
| nylon 6,6 | 38 | 44 | 38 |

TABLE 1-continued

| | Comp. Ex. 1 | Comp. Ex. 2 | Ex. 1 |
|---|---|---|---|
| nylon 6 | 10 | 4 | 10 |
| Conductive Carbon Black | 1.8 | 1.8 | 1.8 |

TABLE 2

| | Comp. Ex. 1 | Comp. Ex. 2 | Ex. 1 |
|---|---|---|---|
| Notched Izod ($kJ/m^2$) | 18.6 | 20.1 | 23.6 |
| Tensile Modulus (MPa) | 2166.0 | 2320.0 | 2178.0 |
| Yield Stress (MPa) | 56.5 | 60.0 | 55.4 |
| Dynatup Energy at Break (J) | 90.2 | 70.0 | 94.2 |
| MV, 300° C., 1500 $s^{-1}$ (Pa-s) | 173.0 | — | 165.0 |
| Vicat-B (° C.) | 180.6 | 192.0 | 186.3 |

TABLE 3

| R5 Fender Property | Comp. Ex. 1 | Comp. Ex. 2 | Ex. 1 |
|---|---|---|---|
| Impact Max speed at failure, 23° C. (km/h) | >15 | >15 | >15 |
| Impact Max speed at failure, −20° C. (km/h) | 5 | 5 | 5 |
| Dimensional heat performance at 185° C. | Not OK | OK | OK |
| Dimensional heat performance at 210° C. | Not OK | Not OK | OK |

Referring now to Table 2, it can be seen that while the tensile properties such as modulus and yield strength for the Comparative Example 2 are slightly superior to those of Comparative Example 1 and Example 1, the impact properties of Example 1 are superior to those of Comparative Examples 1 and 2. In addition, the Vicat B softening temperature shows a superior performance for Comparative Example 2 (192° C.) as compared with Example 1 (186.3° C.) and Comparative Example 1 (180.6° C.). The R5 fender results however, shows that while the impact test performance at room temperature and −20° C. for all three samples is acceptable, the heat performance results for formulation 3 is strikingly superior to those of Comparative Examples 1 and 2. For Comparative Example 1, the sample starts losing dimensional stability at temperatures higher than 185° C., while the Comparative Example 2, which has a Vicat-B softening temperature higher than that for Example 1, loses dimensional stability at temperatures of about 205° C. The Example 1 composition, on the other hand, displays dimensional stability on the R5 fender up to 215° C., despite having a heat distortion temperature of 186.3° C. This result is both surprising and unexpected.

EXAMPLES 2–33

Comparative Examples 3–7

Various compositions were prepared, varying in polyphenylene ether composition, polyphenylene ether intrinsic viscosity, nylon 6 and nylon 6,6 amounts, impact modifier amounts, compatibilizer amounts, antioxidant type, antioxidant amounts, PELTP amount, and stabilizer amount. Components are as described for Example 1 and Comparative Examples 1 and 2, except that a variety of polyphenylene ether copolymers were used. These polyphenylene ether copolymers were the polymerization products of mixtures of 2,6-dimethylphenol and 2,3,6-trimethylphenol, and the copolymers had intrinsic viscosities (IV) of 0.33 dL/g to 0.40 dL/g, 2,6-dimethyl-1,4-phenylene ether contents of 80.5 to 83.5 weight percent, and 2,3,6-trimethyl-1,4-phenylene ether (2,3,6-TMPE) contents of 16.5 to 19.5 weight percent.

Compositions and properties are given in Table 4. All tensile properties were measured according to ISO 527. All falling dart (Dynatup) impact properties were measured according to ISO 6603-2.

Specific Volume Resistivity (SVR) was measured as follows. A tensile bar was molded according to ISO 3167. A sharp, shallow cut was made near each end of the narrow central portion of the bar. The bar was fractured in a brittle fashion at each cut to separate the narrow central portion, now having fractured ends with dimensions of about 10×4 millimeters. If necessary to obtain fracturing in a brittle fashion, the tensile bar was first cooled, for example, in dry ice or liquid nitrogen in a −40° C. freezer. The length of the bar between the fractured ends was measured. The fractured ends of the sample were painted with conductive silver paint, and the paint was allowed to dry for about one-half hour. Using a multi-meter in resistance mode, electrodes were attached to each of the painted surfaces, and the resistance was measured at an applied voltage of 500–1000 millivolts. Values of specific volume resistivity were obtained by multiplying the measured resistance by the fracture area of one side of the bar and dividing by the length:

$$\rho = R \times A/L$$

where ρ is the specific volume resistivity in ohm-cm, R is the measured resistance in ohms, A is the fractured area in $cm^2$, and L is the sample length in cm. The specific volume resistivity values thus have units of Ohm-cm.

The results show excellent property balances for Examples versus Comparative Examples. These experiments illustrate the robustness of properties to modest changes in raw material properties and amounts.

TABLE 4

| | C. Ex. 3 | Ex. 2 | Ex. 3 | Ex. 4 |
|---|---|---|---|---|
| COMPOSITION | | | | |
| PPE 2,3,6-TMPE content (wt %) | 0 | 19.5 | 16.5 | 16.5 |
| PPE IV (dL/g) | 0.40 | 0.40 | 0.33 | 0.40 |
| PPE amount (wt %) | 34.09 | 30.00 | 37.20 | 35.00 |
| SEBS amount (wt %) | 7.00 | 10.00 | 10.00 | 7.00 |
| SEP amount (wt %) | 8.00 | 6.00 | 6.00 | 7.00 |
| Citric Acid amount (wt %) | 0.70 | 0.50 | 0.50 | 0.70 |
| IRGANOX ® 1010 amount (wt %) | 0 | 0.30 | 0.30 | 0.30 |
| IRGANOX ® 1098 amount (wt %) | 0 | 0.10 | 0.10 | 0.10 |
| PELTP amount (wt %) | 0 | 0.10 | 0.10 | 0.10 |
| IRGANOX ® 1076 amount (wt %) | 0.30 | 0 | 0 | 0 |
| KI, 50% in water (wt %) | 0.10 | 0 | 0 | 0 |
| CuI (wt %) | 0.01 | 0 | 0 | 0 |
| nylon 6,6 (wt %) | 38.00 | 42.00 | 34.00 | 38.00 |
| nylon 6 (wt %) | 10.00 | 9.20 | 10.00 | 10.00 |
| Conductive Carbon Black (wt %) | 1.80 | 1.80 | 1.80 | 1.80 |
| PROPERTIES | | | | |
| Tensile Modulus (MPa) | 2098.0 | 2125.0 | 2098.0 | 2163.0 |
| Tensile Yield Stress (MPa) | 52.6 | 52.3 | 53.7 | 54.1 |
| Tensile Yield Strain (%) | 4.6 | 4.8 | 4.1 | 4.9 |
| Tensile Maximum Stress (MPa) | 52.6 | 52.3 | 53.7 | 54.1 |
| Tensile Strain at Max. (%) | 4.8 | 5.0 | 4.1 | 5.0 |
| Tensile Elongation at Break (%) | 41.7 | 41.5 | 41.3 | 37.9 |
| Tensile Stress at Failure (MPa) | 49.9 | 50.9 | 50.1 | 52.4 |

TABLE 4-continued

| | | | | |
|---|---|---|---|---|
| Notched Izod, 23° C. (MPa) | 40.1 | 22.6 | 19.5 | 21.5 |
| Dynatup Max. Force, 23° C. (N) | 8123 | 9006 | 7701 | 9074 |
| Dynatup Energy at Max., 23° C. (J) | 56.7 | 71.6 | 45.3 | 65.8 |
| Dynatup Energy at Break, 23° C. (J) | 62.3 | 80.7 | 48.3 | 70.8 |
| Dynatup Deflection at Break, 23° C. (%) | 13.3 | 14.9 | 11.8 | 14.0 |
| Vicat-B (° C.) | 181.4 | 181.8 | 178.7 | 188.7 |
| SVR (kOhm-cm) | 4.30 | 15.30 | 2.30 | 3.68 |
| | Ex. 5 | Ex. 6 | Ex. 7 | Ex. 8 |
| COMPOSITION | | | | |
| PPE 2,3,6-TMPE content (wt %) | 16.50 | 19.50 | 19.50 | 16.50 |
| PPE IV (dL/g) | 0.40 | 0.33 | 0.33 | 0.40 |
| PPE amount (wt %) | 30.80 | 36.80 | 31.20 | 32.80 |
| SEBS amount (wt %) | 10.00 | 6.00 | 10.00 | 6.00 |
| SEP amount (wt %) | 6.00 | 10.00 | 6.00 | 6.00 |
| Citric Acid amount (wt %) | 0.90 | 0.90 | 0.50 | 0.90 |
| IRGANOX ® 1010 amount (wt %) | 0.30 | 0.30 | 0.30 | 0.30 |
| IRGANOX ® 1098 amount (wt %) | 0.10 | 0.10 | 0.10 | 0.10 |
| PELTP amount (wt %) | 0.10 | 0.10 | 0.10 | 0.10 |
| IRGANOX ® 1076 amount (wt %) | 0 | 0 | 0 | 0 |
| KI, 50% in water (wt %) | 0 | 0 | 0 | 0 |
| CuI (wt %) | 0 | 0 | 0 | 0 |
| nylon 6,6 (wt %) | 42.00 | 34.00 | 42.00 | 40.00 |
| nylon 6 (wt %) | 8.00 | 10.00 | 8.00 | 12.00 |
| Conductive Carbon Black (wt %) | 1.80 | 1.80 | 1.80 | 1.80 |
| PROPERTIES | | | | |
| Tensile Modulus (MPa) | 2107.0 | 2056.0 | 2122.0 | 2273.0 |
| Tensile Yield Stress (MPa) | 51.1 | 51.3 | 52.5 | 56.9 |
| Tensile Yield Strain (%) | 5.3 | 4.5 | 4.8 | 4.9 |
| Tensile Maximum Stress (MPa) | 51.4 | 51.3 | 52.5 | 56.9 |
| Tensile Strain at Max. (%) | 41.0 | 4.6 | 4.9 | 4.9 |
| Tensile Elongation at Break (%) | 45.6 | 46.3 | 22.7 | 40.2 |
| Tensile Stress at Failure (MPa) | 50.9 | 49.5 | 51.6 | 54.2 |
| Notched Izod, 23° C. (MPa) | 22.1 | 20.4 | 19.2 | 19.8 |
| Dynatup Max. Force, 23° C. (N) | 9248 | 8237 | 9114 | 9246 |
| Dynatup Energy at Max., 23° C. (J) | 70.6 | 55.6 | 66.9 | 63.0 |
| Dynatup Energy at Break, 23° C. (J) | 77.9 | 60.9 | 73.0 | 69.2 |
| Dynatup Deflection at Break, 23° C. (%) | 14.7 | 13.2 | 14.3 | 13.4 |
| Vicat-B (° C.) | 182.9 | 179.7 | 183.6 | 191.1 |
| SVR (kOhm-cm) | 7.73 | 3.27 | 1.20 | 18.80 |
| | Ex. 9 | Ex. 10 | Ex. 11 | Ex. 12 |
| COMPOSITION | | | | |
| PPE 2,3,6-TMPE content (wt %) | 16.50 | 16.50 | 19.50 | 16.50 |
| PPE IV (dL/g) | 0.33 | 0.40 | 0.40 | 0.33 |
| PPE amount (wt %) | 38.00 | 32.80 | 30.00 | 36.80 |
| SEBS amount (wt %) | 6.00 | 6.00 | 6.00 | 6.00 |
| SEP amount (wt %) | 6.00 | 6.00 | 10.00 | 10.00 |
| Citric Acid amount (wt %) | 0.90 | 0.90 | 0.90 | 0.90 |
| IRGANOX ® 1010 amount (wt %) | 0.30 | 0.30 | 0.30 | 0.30 |
| IRGANOX ® 1098 amount (wt %) | 0.10 | 0.10 | 0.10 | 0.10 |
| PELTP amount (wt %) | 0.10 | 0.10 | 0.10 | 0.10 |
| IRGANOX ® 1076 amount (wt %) | 0 | 0 | 0 | 0 |
| KI, 50% in water (wt %) | 0 | 0 | 0 | 0 |
| CuI (wt %) | 0 | 0 | 0 | 0 |
| nylon 6,6 (wt %) | 34.80 | 40.00 | 38.80 | 36.00 |
| nylon 6 (wt %) | 12.00 | 12.00 | 12.00 | 8.00 |
| Conductive Carbon Black (wt %) | 1.80 | 1.80 | 1.80 | 1.80 |
| PROPERTIES | | | | |
| Tensile Modulus (MPa) | 2271.0 | 2270.0 | 2127.0 | 2119.0 |
| Tensile Yield Stress (MPa) | 59.9 | 57.3 | 53.0 | 54.1 |

TABLE 4-continued

| | | | | |
|---|---|---|---|---|
| Tensile Yield Strain (%) | 4.3 | 4.9 | 4.4 | 4.3 |
| Tensile Maximum Stress (MPa) | 59.9 | 57.3 | 53.0 | 54.1 |
| Tensile Strain at Max. (%) | 4.3 | 5.0 | 4.4 | 4.3 |
| Tensile Elongation at Break (%) | 24.0 | 38.4 | 43.9 | 38.6 |
| Tensile Stress at Failure (MPa) | 55.0 | 54.8 | 50.3 | 50.2 |
| Notched Izod, 23° C. (MPa) | 17.2 | 18.9 | 22.7 | 17.9 |
| Dynatup Max. Force, 23° C. (N) | 9214 | 9546 | 9236 | 8808 |
| Dynatup Energy at Max., 23° C. (J) | 63.1 | 70.8 | 76.0 | 68.7 |
| Dynatup Energy at Break, 23° C. (J) | 67.8 | 77.4 | 87.9 | 76.3 |
| Dynatup Deflection at Break, 23° C. (%) | 13.4 | 14.3 | 15.2 | 14.6 |
| Vicat-B (° C.) | 188 | 189.3 | 180.8 | 177.3 |
| SVR (kOhm-cm) | 8.00 | 13.60 | 15.20 | 2.80 |

| | C. Ex. 4 | C. Ex. 5 | Ex. 13 | Ex. 14 |
|---|---|---|---|---|
| COMPOSITION | | | | |
| PPE 2,3,6-TMPE content (wt %) | 0 | 0 | 19.50 | 16.50 |
| PPE IV (dL/g) | 0 | 0 | 0.40 | 0.40 |
| PPE amount (wt %) | 34.09 | 34.09 | 36.80 | 38.00 |
| SEBS amount (wt %) | 7.00 | 7.00 | 10.00 | 6.00 |
| SEP amount (wt %) | 3.00 | 8.00 | 6.00 | 6.00 |
| Citric Acid amount (wt %) | 0.70 | 0.70 | 0.90 | 0.50 |
| IRGANOX ® 1010 amount (wt %) | 0 | 0 | 0.30 | 0.30 |
| IRGANOX ® 1098 amount (wt %) | 0 | 0 | 0.10 | 0.10 |
| PELTP amount (wt %) | 0 | 0 | 0.10 | 0.10 |
| IRGANOX ® 1076 amount (wt %) | 0.30 | 0.30 | 0 | 0 |
| KI, 50% in water (wt %) | 0.10 | 0.10 | 0 | 0 |
| CuI (wt %) | 0.01 | 0.01 | 0 | 0 |
| nylon 6,6 (wt %) | 38.00 | 38.00 | 34.00 | 39.20 |
| nylon 6 (wt %) | 10.00 | 10.00 | 10.00 | 8.00 |
| Conductive Carbon Black (wt %) | 1.80 | 1.80 | 1.80 | 1.80 |
| PROPERTIES | | | | |
| Tensile Modulus (MPa) | 2101.0 | 2098.0 | 2057.0 | 2223.0 |
| Tensile Yield Stress (MPa) | 52.8 | 52.7 | 52.1 | 56.2 |
| Tensile Yield Strain (%) | 4.6 | 4.7 | 4.2 | 5.0 |
| Tensile Maximum Stress (MPa) | 52.8 | 52.7 | 52.1 | 56.2 |
| Tensile Strain at Max. (%) | 4.7 | 4.7 | 4.2 | 5.0 |
| Tensile Elongation at Break %) | 50.9 | 41.5 | 38.3 | 38.5 |
| Tensile Stress at Failure (MPa) | 50.0 | 49.9 | 50.0 | 53.9 |
| Notched Izod, 23° C. (MPa) | 34.1 | 41.7 | 20.6 | 19.5 |
| Dynatup Max. Force, 23° C. (N) | 8788 | 8909 | 8543 | 9087 |
| Dynatup Energy at Max., 23° C. (J) | 70.0 | 76.5 | 63.8 | 61.7 |
| Dynatup Energy at Break, 23° C. (J) | 83.5 | 95.1 | 70.9 | 66.6 |
| Dynatup Deflection at Break, 23° C. (%) | 14.8 | 15.6 | 14.3 | 13.4 |
| Vicat-B (° C.) | 183.6 | 180.8 | 176.9 | 195 |
| SVR (kOhm-cm) | 4.50 | 19.20 | 6.90 | 16.30 |

| | Ex. 15 | Ex. 16 | Ex. 17 | Ex. 18 |
|---|---|---|---|---|
| COMPOSITION | | | | |
| PPE 2,3,6-TMPE content (wt %) | 19.50 | 16.50 | 18.00 | 16.50 |
| PPE IV (dL/g) | 0.33 | 0.33 | 0.365 | 0.40 |
| PPE amount (wt %) | 35.0 | 35.00 | 35.00 | 38.00 |
| SEBS amount (wt %) | 7.00 | 7.00 | 7.00 | 6.00 |
| SEP amount (wt %) | 7.00 | 7.00 | 7.00 | 6.00 |
| Citric Acid amount (wt %) | 0.70 | 0.70 | 0.70 | 0.50 |
| IRGANOX ® 1010 amount (wt %) | 0.30 | 0.30 | 0.30 | 0.30 |
| IRGANOX ® 1098 amount (wt %) | 0.10 | 0.10 | 0.10 | 0.10 |
| PELTP amount (wt %) | 0.10 | 0.10 | 0.10 | 0.10 |
| IRGANOX ® 1076 amount (wt %) | 0 | 0 | 0 | 0 |
| KI, 50% in water (wt %) | 0 | 0 | 0 | 0 |
| CuI (wt %) | 0 | 0 | 0 | 0 |
| nylon 6,6 (wt %) | 38.00 | 38.00 | 38.00 | 39.20 |
| nylon 6 (wt %) | 10.00 | 10.00 | 10.00 | 8.00 |
| Conductive Carbon Black (wt %) | 1.80 | 1.80 | 1.80 | 1.80 |
| PROPERTIES | | | | |
| Tensile Modulus (MPa) | 2163.0 | 2179.0 | 2185.0 | 2242.0 |
| Tensile Yield Stress (MPa) | 54.8 | 55.1 | 55.9 | 56.8 |
| Tensile Yield Strain (%) | 4.7 | 4.6 | 4.3 | 4.8 |
| Tensile Maximum Stress (MPa) | 54.8 | 55.1 | 55.9 | 56.9 |
| Tensile Strain at Max. (%) | 4.9 | 4.7 | 4.4 | 4.9 |
| Tensile Elongation at Break (%) | 41.1 | 43.6 | 44.8 | 44.8 |
| Tensile Stress at Failure (MPa) | 52.1 | 52.1 | 52.0 | 54.0 |
| Notched Izod, 23° C. (MPa) | 21.55 | 20.45 | 18.98 | 18.53 |
| Dynatup Max. Force, 23° C. (N) | 9144 | 9006 | 9232 | 9443 |
| Dynatup Energy at Max., 23° C. (J) | 68.4 | 64.7 | 71.6 | 69.7 |
| Dynatup Energy at Break, 23° C. (J) | 77.8 | 69.6 | 84.2 | 74.2 |
| Dynatup Deflection at Break, 23° C. (%) | 14.4 | 14 | 14.7 | 14.2 |
| Vicat-B (° C.) | 188.9 | 183.7 | 186.4 | 193.9 |
| SVR (kOhm-cm) | 21.70 | 6.46 | 5.32 | 2.63 |

| | Ex. 19 | Ex. 20 | Ex. 21 | Ex. 22 |
|---|---|---|---|---|
| COMPOSITION | | | | |
| PPE 2,3,6-TMPE content (wt %) | 19.50 | 18.00 | 18.00 | 19.50 |
| PPE IV (dL/g) | 0.40 | 0.365 | 0.365 | 0.40 |
| PPE amount (wt %) | 37.20 | 35.00 | 31.20 | 34.80 |
| SEBS amount (wt %) | 6.00 | 7.00 | 6.00 | 6.00 |
| SEP amount (wt %) | 10.00 | 7.00 | 10.00 | 6.00 |
| Citric Acid amount (wt %) | 0.50 | 0.70 | 0.50 | 0.90 |
| IRGANOX ® 1010 amount (wt %) | 0.30 | 0.30 | 0.30 | 0.30 |
| IRGANOX ® 1098 amount (wt %) | 0.10 | 0.10 | 0.10 | 0.10 |
| PELTP amount (wt %) | 0.10 | 0.10 | 0.10 | 0.10 |
| IRGANOX ® 1076 amount (wt %) | 0 | 0 | 0 | 0 |
| KI, 50% in water (wt %) | 0 | 0 | 0 | 0 |
| CuI (wt %) | 0 | 0 | 0 | 0 |
| nylon 6,6 (wt %) | 36.00 | 38.00 | 42.00 | 42.00 |
| nylon 6 (wt %) | 8.00 | 10.00 | 8.00 | 8.00 |
| Conductive Carbon Black (wt %) | 1.80 | 1.80 | 1.80 | 1.80 |
| PROPERTIES | | | | |
| Tensile Modulus (MPa) | 2084.0 | 2181.0 | 2117.0 | 2290.0 |
| Tensile Yield Stress (MPa) | 52.3 | 55.5 | 53.0 | 59.2 |
| Tensile Yield Strain (%) | 4.5 | 4.6 | 4.7 | 4.4 |
| Tensile Maximum Stress (MPa) | 52.4 | 55.6 | 53.0 | 59.2 |
| Tensile Strain at Max. (%) | 4.5 | 4.7 | 4.7 | 4.4 |
| Tensile Elongation at Break (%) | 41.2 | 22.1 | 25.6 | 34.8 |
| Tensile Stress at Failure (MPa) | 50.0 | 53.1 | 51.1 | 55.0 |
| Notched Izod, 23° C. (MPa) | 20.07 | 18.32 | 20.21 | 17.22 |
| Dynatup Max. Force, 23° C. (N) | 8928 | 9120 | 8917 | 9673 |
| Dynatup Energy at Max., 23° C. (J) | 69.4 | 68.9 | 64.4 | 73.5 |
| Dynatup Energy at Break, 23° C. (J) | 77.8 | 76.5 | 72.9 | 81.1 |
| Dynatup Deflection at Break, 23° C. (%) | 14.7 | 14.3 | 14.0 | 14.4 |
| Vicat-B (° C.) | 176.6 | 186.4 | 182.1 | 187.4 |
| SVR (kOhm-cm) | 2.07 | 8.77 | 13.48 | 6.37 |

| | Ex. 23 | C. Ex. 6 | C. Ex. 7 | Ex. 24 |
|---|---|---|---|---|
| COMPOSITION | | | | |
| PPE 2,3,6-TMPE content (wt %) | 19.50 | 0 | 0 | 19.50 |
| PPE IV (dL/g) | 0.40 | 0 | 0 | 0.33 |
| PPE amount (wt %) | 38.00 | 34.09 | 34.09 | 30.00 |
| SEBS amount (wt %) | 6.00 | 7.00 | 7.00 | 6.00 |
| SEP amount (wt %) | 6.00 | 8.00 | 8.00 | 10.00 |
| Citric Acid amount (wt %) | 0.50 | 0.70 | 0.70 | 0.50 |
| IRGANOX ® 1010 amount (wt %) | 0.30 | 0 | 0 | 0.30 |
| IRGANOX ® 1098 amount (wt %) | 0.10 | 0 | 0 | 0.10 |
| PELTP amount (wt %) | 0.10 | 0 | 0 | 0.10 |

TABLE 4-continued

| | | | | |
|---|---|---|---|---|
| IRGANOX ® 1076 amount (wt %) | 0 | 0.30 | 0.30 | 0 |
| KI, 50% in water (wt %) | 0 | 0.10 | 0.10 | 0 |
| CuI (wt %) | 0 | 0.01 | 0.01 | 0 |
| nylon 6,6 (wt %) | 35.20 | 38.00 | 38.00 | 42.00 |
| nylon 6 (wt %) | 12.00 | 10.00 | 10.00 | 9.20 |
| Conductive Carbon Black (wt %) | 1.80 | 1.80 | 1.80 | 1.80 |
| PROPERTIES | | | | |
| Tensile Modulus (MPa) | 2289.0 | 2097.0 | 2073.0 | 2072.0 |
| Tensile Yield Stress (MPa) | 59.5 | 52.8 | 52.1 | 51.2 |
| Tensile Yield Strain (%) | 4.3 | 4.8 | 4.7 | 4.8 |
| Tensile Maximum Stress (MPa) | 59.5 | 52.8 | 52.1 | 51.2 |
| Tensile Strain at Max. (%) | 4.3 | 4.9 | 4.8 | 5.0 |
| Tensile Elongation at Break (%) | 33.8 | 40.8 | 52.0 | 41.7 |
| Tensile Stress at Failure (MPa) | 53.9 | 50.3 | 49.5 | 50.1 |
| Notched Izod, 23° C. (MPa) | 17.08 | 23.34 | 25.09 | 21.59 |
| Dynatup Max. Force, 23° C. (N) | 9617 | 9350 | 8936 | 8996 |
| Dynatup Energy at Max., 23° C. (J) | 71.2 | 75.7 | 72.4 | 70.4 |
| Dynatup Energy at Break, 23° C. (J) | 78.1 | 87.3 | 82.0 | 77.6 |
| Dynatup Deflection at Break, 23° C. (%) | 14.3 | 15.3 | 15.1 | 14.9 |
| Vicat-B (° C.) | 187.7 | 180.8 | 180.2 | 184.0 |
| SVR (kOhm-cm) | 2.31 | 4.10 | 6.16 | 26.78 |

| | Ex. 25 | Ex. 26 | Ex. 27 | Ex. 28 |
|---|---|---|---|---|
| COMPOSITION | | | | |
| PPE 2,3,6-TMPE content (wt %) | 19.50 | 16.50 | 16.50 | 16.5 |
| PPE IV (dL/g) | 0.40 | 0.33 | 0.33 | 0.40 |
| PPE amount (wt %) | 34.80 | 35.20 | 30.00 | 35.20 |
| SEBS amount (wt %) | 6.00 | 6.00 | 6.00 | 10.00 |
| SEP amount (wt %) | 6.00 | 6.00 | 10.00 | 6.00 |
| Citric Acid amount (wt %) | 0.90 | 0.50 | 0.50 | 0.50 |
| IRGANOX ® 1010 amount (wt %) | 0.30 | 0.30 | 0.30 | 0.30 |
| IRGANOX ® 1098 amount (wt %) | 0.10 | 0.10 | 0.10 | 0.10 |
| PELTP amount (wt %) | 0.10 | 0.10 | 0.10 | 0.10 |
| IRGANOX ® 1076 amount (wt %) | 0 | 0 | 0 | 0 |
| KI, 50% in water (wt %) | 0 | 0 | 0 | 0 |
| CuI (wt %) | 0 | 0 | 0 | 0 |
| nylon 6,6 (wt %) | 42.00 | 42.00 | 39.20 | 34.00 |
| nylon 6 (wt %) | 8.00 | 8.00 | 12.00 | 12.00 |
| Conductive Carbon Black (wt %) | 1.80 | 1.80 | 1.80 | 1.80 |
| PROPERTIES | | | | |
| Tensile Modulus (MPa) | 2299.0 | 2291.0 | 2101.0 | 2035.0 |
| Tensile Yield Stress (MPa) | 59.4 | 59.3 | 53.1 | 51.1 |
| Tensile Yield Strain (%) | 4.3 | 4.2 | 4.4 | 4.7 |
| Tensile Maximum Stress (MPa) | 59.4 | 59.6 | 53.1 | 51.1 |
| Tensile Strain at Max. (%) | 4.3 | 4.2 | 4.4 | 4.9 |
| Tensile Elongation at Break (%) | 23.7 | 38.9 | 36.6 | 46.5 |
| Tensile Stress at Failure (MPa) | 56.2 | 55.4 | 50.1 | 49.7 |
| Notched Izod, 23° C. (MPa) | 17.05 | 17.36 | 22.21 | 23.10 |
| Dynatup Max. Force, 23° C. (N) | 9002 | 9399 | 8974 | 8993 |
| Dynatup Energy at Max., 23° C. (J) | 57.3 | 69.2 | 68.7 | 73.0 |
| Dynatup Energy at Break, 23° C. (J) | 60.5 | 79.9 | 82.7 | 82.9 |
| Dynatup Deflection at Break, 23° C. (%) | 12.8 | 14.0 | 14.5 | 15.2 |
| Vicat-B (° C.) | 192.4 | 189.8 | 182.2 | 180.6 |
| SVR (kOhm-cm) | 23.43 | 41.50 | 137.80 | 13.62 |

| | Ex. 29 | Ex. 30 | Ex. 31 | Ex. 32 |
|---|---|---|---|---|
| COMPOSITION | | | | |
| PPE 2,3,6-TMPE content (wt %) | 19.50 | 16.50 | 18.00 | 18.00 |
| PPE IV (dL/g) | 0.40 | 0.33 | 0.365 | 0.365 |
| PPE amount (wt %) | 35.00 | 30.80 | 38.00 | 30.00 |
| SEBS amount (wt %) | 7.00 | 10.00 | 6.00 | 6.00 |
| SEP amount (wt %) | 7.00 | 6.00 | 9.20 | 10.00 |
| Citric Acid amount (wt %) | 0.70 | 0.90 | 0.50 | 0.50 |
| IRGANOX ® 1010 amount (wt %) | 0.30 | 0.30 | 0.30 | 0.30 |
| IRGANOX ® 1098 amount (wt %) | 0.10 | 0.10 | 0.10 | 0.10 |
| PELTP amount (wt %) | 0.10 | 0.10 | 0.10 | 0.10 |
| IRGANOX ® 1076 amount (wt %) | 0 | 0 | 0 | 0 |
| KI, 50% in water (wt %) | 0 | 0 | 0 | 0 |
| CuI (wt %) | 0 | 0 | 0 | 0 |
| nylon 6,6 (wt %) | 38.00 | 42.00 | 34.00 | 42.00 |
| nylon 6 (wt %) | 10.00 | 8.00 | 10.00 | 9.20 |
| Conductive Carbon Black (wt %) | 1.80 | 1.80 | 1.80 | 1.80 |
| PROPERTIES | | | | |
| Tensile Modulus (MPa) | 2178.0 | 2115.0 | 2087.0 | 2090.0 |
| Tensile Yield Stress (MPa) | 55.8 | 53.4 | 53.4 | 52.6 |
| Tensile Yield Strain (%) | 4.4 | 43.0 | 4.5 | 4.6 |
| Tensile Maximum Stress (MPa) | 55.8 | 54.3 | 53.4 | 52.6 |
| Tensile Strain at Max. (%) | 4.4 | 4.3 | 4.6 | 4.6 |
| Tensile Elongation at Break (%) | 42.7 | 43.5 | 42.3 | 41.1 |
| Tensile Stress at Failure (MPa) | 52.1 | 50.8 | 50.2 | 50.2 |
| Notched Izod, 23° C. (MPa) | 19.73 | 18.84 | 19.42 | 20.80 |
| Dynatup Max. Force, 23° C. (N) | 9114 | 9106 | 9036 | 8911 |
| Dynatup Energy at Max., 23° C. (J) | 69.4 | 71.2 | 70.6 | 65.1 |
| Dynatup Energy at Break, 23° C. (J) | 84.1 | 81.7 | 77.0 | 72.9 |
| Dynatup Deflection at Break, 23° C. (%) | 14.4 | 14.8 | 14.8 | 14.2 |
| Vicat-B (° C.) | 185.8 | 181.9 | 181.4 | 179.4 |
| SVR (kOhm-cm) | 14.16 | 19.50 | 1.83 | 26.50 |

| | Ex. 33 | C. Ex. 8 |
|---|---|---|
| COMPOSITION | | |
| PPE 2,3,6-TMPE content (wt %) | 16.50 | 0 |
| PPE IV (dL/g) | 0.40 | 0 |
| PPE amount (wt %) | 35.20 | 34.09 |
| SEBS amount (wt %) | 10.00 | 7.00 |
| SEP amount (wt %) | 6.00 | 8.00 |
| Citric Acid amount (wt %) | 0.50 | 0.70 |
| IRGANOX ® 1010 amount (wt %) | 0.30 | 0 |
| IRGANOX ® 1098 amount (wt %) | 0.10 | 0 |
| PELTP amount (wt %) | 0.10 | 0 |
| IRGANOX ® 1076 amount (wt %) | 0 | 0.30 |
| KI, 50% in water (wt %) | 0 | 0.10 |
| CuI (wt %) | 0 | 0.01 |
| nylon 6,6 (wt %) | 34.00 | 38.00 |
| nylon 6 (wt %) | 12.00 | 10.00 |
| Conductive Carbon Black (wt %) | 1.80 | 1.80 |
| PROPERTIES | | |
| Tensile Modulus (MPa) | 2071.0 | 2085.0 |
| Tensile Yield Stress (MPa) | 51.5 | 52.4 |
| Tensile Yield Strain (%) | 4.5 | 4.7 |
| Tensile Maximum Stress (MPa) | 51.5 | 52.4 |
| Tensile Strain at Max. (%) | 4.5 | 5.0 |
| Tensile Elongation at Break (%) | 36.5 | 46.3 |
| Tensile Stress at Failure (MPa) | 49.8 | 50.0 |
| Notched Izod, 23° C. (MPa) | 22.21 | 21.35 |
| Dynatup Max. Force, 23° C. (N) | 8818 | 9217 |
| Dynatup Energy at Max., 23° C. (J) | 65.9 | 72.4 |
| Dynatup Energy at Break, 23° C. (J) | 73.5 | 81.5 |
| Dynatup Deflection at Break, 23° C. (%) | 20.6 | 15.0 |
| Vicat-B (° C.) | 179.1 | 180.3 |
| SVR (kOhm-cm) | 4.88 | 3.35 |

In summary, the compositions provide markedly improved thermal stability and improved impact strength compared to known polyphenylene ether-polyamide blends.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments failing within the scope of the appended claims.

All cited patents, patent applications, and other references are incorporated herein by reference in their entirety.

The invention claimed is:

1. A conductive thermoplastic composition consisting essentially of:

about 20 to about 60 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units, based on the total weight of the polyphenylene ether copolymer;

about 30 to about 65 weight percent of a polyamide, based on the total weight of the composition;

about 1 to about 30 weight percent, based on the total weight of the composition, of an impact modifier selected from the group consisting of a styrene-(ethylene-butylene)-styrene triblock copolymer, a styrene-(ethylene-propylene) diblock copolymer, and a combination of a styrene-(ethylene-butylene)-styrene triblock copolymer and a styrene-(ethylene-propylene) diblock copolymer; and about 0.025 to about 40 weight percent of an electrically conductive filler, based on the total weight of the composition.

2. The composition of claim 1, wherein the polyphenylene ether copolymer has an intrinsic viscosity of about 0.20 to about 2.0 dL/g as measured in chloroform at 25° C.

3. The composition of claim 1, wherein the polyamide comprises about 3 to about 17 weight percent ofpoly(pentamethylene carboximide) and about 32 to about 51 weight percent of poly(hexamethylene adipamide) based on the total weight of the composition.

4. The composition of claim 1, wherein the electrically conductive filler is selected from the group consisting of carbon fibers, vapor grown carbon fibers, carbon nanotubes, carbon black, conductive metal fillers, conductive non-metal fillers, metal-coated fillers, and combinations comprising at least one of the foregoing electrically conductive fillers.

5. The composition of claim 1, wherein the electrically conductive filler comprises about 2 weight percent to about 40 weight percent of carbon fibers, based on the total weight of the composition.

6. The composition of claim 1, wherein the electrically conductive filler comprises about 0.05 weight percent to about 10 weight percent of vapor grown carbon fibers, based on the total weight of the composition.

7. The composition of claim 1, wherein the electrically conductive filler comprises about 0.025 weight percent to about 10 weight percent of carbon nanotubes, based on the total weight of the composition.

8. The composition of claim 1, wherein the electrically conductive filler comprises about 0.5 weight percent to about 20 weight percent of carbon blacks, based on the total weight of the composition.

9. The composition of claim 1, wherein the electrically conductive filler comprises about 1 weight percent to about 40 weight percent of a conductive metal filler, based on the total weight of the composition.

10. The composition of claim 1, wherein the electrically conductive filler comprises about 0.025 weight percent to about 40 weight percent of a conductive non-metal filler, based on the total weight of the composition.

11. The composition of claim 1, wherein the electrically conductive filler comprises about 1 weight percent to about 40 weight percent of a metal-coated filler, based on the total weight of the composition.

12. The composition of claim 1, wherein the composition after molding exhibits a specific volume resistivity up to about $10^5$ ohm-cm.

13. A conductive composition consisting essentially of:

about 30 to about 45 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units, based on the total weight of the polyphenylene ether copolymer;

about 30 to about 65 weight percent of a polyamide selected from the group consisting of poly(hexamethylene adipamide), poly(pentamethylene carboximide), and mixtures thereof, based on the total weight of the composition;

about 5 to about 20 weight percent of an impact modifier consisting of a styrene-(ethylene-butylene)-styrene triblock copolymer and a styrene-(ethylene-propylene) diblock copolymer, based on the total weight of the composition; and about 0.5 to about 5 weight percent of an electrically conductive filler selected from the group comprising a conductive carbon black, vapor grown carbon fibers, and mixtures thereof, based on the total weight of the composition.

14. The composition of claim 13, wherein the electrically conductive filler is added to the composition as a masterbatch in the polyamide.

15. The composition of claim 13, comprising about 5 to about 15 weight percent of the poly(pentamethylene carboximide) and about 25 to about 50 weight percent of the poly(hexamethylene adipamide), based on the total weight of the composition.

16. A conductive composition consisting essentially of:

about 32 to about 38 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units, based on the total weight of the polyphenylene ether;

about 35 to about 40 weight percent of poly(hexamethylene adipamide), based on the total weight of the composition;

about 8 to about 12 weight percent of poly(pentamethylene carboximide), based on the total weight of the composition;

about 5 to about 10 weight percent of a styrene-(ethylene-butadiene)-styrene triblock copolymer, based on the total weight of the composition;

about 5 to about 10 weight percent of a styrene-(ethylene-propylene) diblock copolymer, based on the total weight of the composition;

about 1.0 to about 2.5 weight percent of a conductive carbon black, based on the total weight of the composition.

17. A conductive thermoplastic composition consisting essentially of the reaction product of:

about 20 to about 60 weight percent of a polyphenylene ether copolymer comprising about 75 to about 90 weight percent of 2,6-dimethyl-1,4-phenylene ether units and about 10 to about 25 weight percent of 2,3,6-trimethyl-1,4-phenylene ether units based on the total weight of the polphenylene ether copolymer;

about 30 to about 65 weight percent of a polyamide, based on the total weight of the composition;

about 0.1 to about 5 weight percent of a compatibilizing agent, based on the total weight of the composition;

about 1 to about 30 weight percent, based on the total weight of the composition, of an impact modifier selected from the group consisting of a styrene-(ethylene-butylene)-styrene triblock copolymer, a styrene-(ethylene-propylene) diblock copolymer, and a combination of a styrene-(ethylene-butylene)-styrene triblock copolymer and a styrene-(ethylene-propylene) diblock copolymer; and about 0.025 to about 40 weight percent of an electrically conductive filler, based on the total weight of the composition.

18. An article comprising the composition of claim 17.

19. An automobile exterior panel comprising the composition of claim 17.

20. A pellet comprising the composition of claim 17.

21. A method for preparing a conductive thermoplastic composition, consisting essentially of:

melt blending about 20 to about 60 weight percent of a polyphenylene ether copolymer comprising about 75 to about 90 weight percent of 2,6-dimethyl- 1,4-phenylene ether units and about 10 to about 25 weight percent of 2,3,6-trimethyl-1,4-phenylene ether units, based on the total weight of the polyphenylene ether copolymer, about 30 to about 65 weight percent of a polyamide, based on the total weight of the composition, about 5 to about 20 weight percent, based on the total weight of the composition, of an impact modifier selected from the group consisting of a styrene-(ethylene-butylene)-styrene triblock copolymer, a styrene-(ethylene-propylene) diblock copolymer, and a combination of a styrene-(ethylene-butylene)-styrene triblock copolymer and a styrene-(ethylene-propylene) diblock copolymer;

about 0.025 to about 40 weight percent of an electrically conductive filler, based on the total weight of the composition, and a compatibilizing agent, based on the total weight of the composition.

22. A conductive thermoplastic composition consisting essentially of:

about 20 to about 60 weight percent of a polyphenylene ether copolymer comprising about 75 to about 90 weight percent of 2,6-dimethyl-l,4-phenylene ether units and about 10 to about 25 weight percent of 2,3,6-trimethyl-1,4-phenylene ether units, based on the total weight of the polyphenylene ether;

about 30 to about 65 weight percent of a polyamide, based on the total weight of the composition;

about 1 about 30 weight percent of an impact modifier consisting of a styrene-(ethylene-butylene)-styrene triblock copolymer and a styrene-(ethylene-propylene) diblock copolymer, based on the total weight of the composition;

about 0.025 to about 40 weight percent of an electrically conductive filler, based on the total weight of the composition; and a product of a reaction of polyphenylene ether, polyamide and a compatibilizing agent.

* * * * *

UNITED STATES PATENT AND TRADEMARK OFFICE

CERTIFICATE OF CORRECTION

PATENT NO. : 7,022,776 B2
APPLICATION NO. : 09/683002
DATED : April 4, 2006
INVENTOR(S) : Bastiaens et al.

It is certified that error appears in the above-identified patent and that said Letters Patent is hereby corrected as shown below:

Column 8,
Line 58, after “cenospheres,” , delete “finite” and insert therefor -- fillite --.

Column 10,
Line 12, after “VECTOR®”, delete “0”.

Column 19,
Line 30, after “length”, delete “$_{p}$=RxA/LI” and insert therefor -- $_{p}=RxA/L$ --.

Column 19,
Line 31, after “where”, delete “$_{p}$” and insert therefor -- $_{p}$ --.

Column 19,
Line 31, after “ohm-cm”, delete “R” and insert therefor -- *R* --.

Column 19,
Line 32, after “ohms,”, delete “A” and insert therefor -- *A* --.

Column 19,
Line 33, after “and”, delete “L” and insert therefor -- *L* --.

Column 21,
Line 23, after “SEP amount (wt %)” (first occurrence), delete “3.00” and insert therefor -- 8.00 --.

Column 25,
Line 9, after “ments”, delete “failing” and insert therefor -- falling --.

Column 25,
Line 38, after “percent”, delete “ofpoly(pen-” and insert therefor -- of poly(pen- --.

UNITED STATES PATENT AND TRADEMARK OFFICE

CERTIFICATE OF CORRECTION

PATENT NO. : 7,022,776 B2
APPLICATION NO. : 09/683002
DATED : April 4, 2006
INVENTOR(S) : Bastiaens et al.

It is certified that error appears in the above-identified patent and that said Letters Patent is hereby corrected as shown below:

Column 25,
Line 62, after “carbon”, delete “blacks,” and insert therefor -- black ,--.

Signed and Sealed this

Third Day of July, 2007

JON W. DUDAS
*Director of the United States Patent and Trademark Office*